US008458353B2

(12) United States Patent
Krishnaswamy et al.

(10) Patent No.: US 8,458,353 B2
(45) Date of Patent: Jun. 4, 2013

(54) METHOD AND APPARATUS FOR LINK AGGREGATION IN A HETEROGENEOUS COMMUNICATION SYSTEM

(75) Inventors: Dilip Krishnaswamy, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 12/731,883

(22) Filed: Mar. 25, 2010

(65) Prior Publication Data

US 2011/0040888 A1    Feb. 17, 2011

Related U.S. Application Data

(60) Provisional application No. 61/233,771, filed on Aug. 13, 2009.

(51) Int. Cl.
*G06F 15/16* (2006.01)

(52) U.S. Cl.
USPC ......................................... 709/231; 370/338

(58) Field of Classification Search
USPC ..................... 709/217, 220, 227, 231, 238
See application file for complete search history.

(56) References Cited

U.S. PATENT DOCUMENTS

| 7,539,175 | B2 | 5/2009 | White et al. | |
|---|---|---|---|---|
| 2003/0174733 | A1* | 9/2003 | Kawai et al. | 370/498 |
| 2005/0108527 | A1 | 5/2005 | Ginzburg et al. | |
| 2007/0097934 | A1* | 5/2007 | Walker et al. | 370/338 |
| 2008/0186900 | A1 | 8/2008 | Chang et al. | |
| 2008/0298314 | A1 | 12/2008 | Dawson et al. | |
| 2009/0046591 | A1 | 2/2009 | Krishnaswamy et al. | |
| 2009/0046598 | A1 | 2/2009 | Krishnaswamy et al. | |
| 2009/0046644 | A1 | 2/2009 | Krishnaswamy et al. | |
| 2009/0046658 | A1 | 2/2009 | Krishnaswamy | |

(Continued)

FOREIGN PATENT DOCUMENTS

| GB | 2408173 | | 5/2005 |
|---|---|---|---|
| GB | 2408173 | A * | 5/2005 |
| WO | 2008095127 | | 8/2008 |

OTHER PUBLICATIONS

A. Nasipuri, S. Ye, J. You, and R. E. Hiromoto, "A MAC Protocol for Mobile Ad Hoc Network Using Directional Antennas," in Proceedings of the IEEE Wireless Communications and Networking Conference (WCNC) 2000; (Chicago, IL, U.S.), Sep. 2000.

(Continued)

*Primary Examiner* — Larry Donaghue
*Assistant Examiner* — Marshall McLeod
(74) *Attorney, Agent, or Firm* — Jeffrey D. Jacobs; Mary Fales

(57) ABSTRACT

Wireless communication devices for communicating via link aggregation in a heterogeneous wireless communication system are disclosed. One such wireless communication device includes logic configured to establish a first communication path between the wireless communication device and a network element, logic configured to discover a peer-to-peer communication link between the wireless communication device and a proxy access terminal, the wireless device and proxy access terminal being separate individual devices, logic configured to establish a second communication path between the wireless communication device and the network element using the discovered peer-to-peer communication link with the proxy access terminal, logic configured to receive data from the network element via both the first and second communication paths, and logic configured to aggregate the received data.

38 Claims, 15 Drawing Sheets

U.S. PATENT DOCUMENTS

| | | |
|---|---|---|
| 2009/0046676 A1 | 2/2009 | Krishnaswamy et al. |
| 2009/0046861 A1 | 2/2009 | Krishnaswamy |
| 2009/0047930 A1 | 2/2009 | Krishnaswamy et al. |
| 2009/0047964 A1 | 2/2009 | Krishnaswamy |
| 2009/0047966 A1 | 2/2009 | Krishnaswamy et al. |
| 2009/0049158 A1 | 2/2009 | Krishnaswamy et al. |
| 2009/0073943 A1 | 3/2009 | Krishnaswamy et al. |

OTHER PUBLICATIONS

Y.B. Ko, V. Shankarkumar, and N. H. Vaidya, "Medium Access Control Protocols Using Directional Antennas in Ad Hoc Networks," in IEEE INFOCOM 2000, Mar. 2000.

Yu Wang and J.J. Garcia-Luna-Aceves, "Spatial reuse and collision avoidance in ad hoc networks with directional antennas," In Proceedings of Global Telecommunications Conference (GLOBECOM), vol. 1, pp. 112-116, Nov. 17-21, 2002.

Hung-Yun Hsieh, "On Using Peer-to-Peer Communication in Cellular Wireless Data Networks", IEEE Transactions on Mobile Computing, vol. 3, No. 1, Jan.-Mar. 2004.

A. Ford, Ed., C. Raiciu, M. Handley, S. Barre; TCP Extensions for Mulitpath Operation with Multiple Addresses; draft-ford-mptcp-multiaddressed-00; May 2009. http://tools.ietf.org/html/draft-ford-mptcp-multiaddressed-00.

Krishnaswamy, Dilip, "AWiMA: An architecture for Adhoc Wireless Mobile Internet-Access," IEEE Globecom, Dec. 2008, New Orleans, Louisiana, pp. 1-5.

International Search Report and Written Opinion—PCT/US2010/043450, International Searching Authority—European Patent Office, Nov. 4, 2010

Xiao, Yang: "IEEE 802.11N: Enhancements for Higher Throughput in Wireless LANs" IEEE Wireless Communications, IEEE Service Center, Piscataway, NJ, vol. 12, No. 6, Dec. 1, 2005, pp. 82-91.

Yoon, et al., "iDLS: Inter-BSS Direct Link Setup in IEEE 802.11 WLANs" Communications and Information Technologies, 2007. ISCIT '07. International Symposium on, IEEE, PI, Oct. 1, 2007, pp. 1015-1020, Sections I to III, XP031166610.

\* cited by examiner

METHOD AND APPARATUS FOR LINK AGGREGATION IN A HETEROGENEOUS COMMUNICATION SYSTEM

CLAIM OF PRIORITY UNDER 35 U.S.C. §119

The present application for patent claims priority to Provisional Application No. 61/233,771 entitled "A METHOD AND APPARATUS FOR LINK AGGREGATION IN A HETEROGENEOUS COMMUNICATION SYSTEM" filed Aug. 13, 2009, and assigned to the assignee hereof and hereby expressly incorporated by reference herein.

FIELD OF DISCLOSURE

The disclosed aspects relate generally to link aggregation in heterogeneous communication systems, and more specifically, to wireless heterogeneous communication systems.

BACKGROUND

Increasing numbers of different wireless technologies and networks continue to emerge, oftentimes in overlapping coverage areas. Thus, wireless heterogeneous networks are becoming more common. For example, networks ranging from wireless local area networks (WLANs), to wireless wide area networks (WWANs), to wireless personal area networks (WPANs), and cellular communication systems may co-exist in geographical areas and consequently have overlapping coverage areas.

A common problem with some WWAN networks is the ability to transmit and receive data at a high enough rate as desired. As more applications increase in complexity and ability, e.g., multimedia broadcasting, the need to transmit and receive data at higher speeds correspondingly increases. The available bandwidth for applications at a client node over a WWAN link may be limited by the performance on the link, or inhibited by platform constraints to process traffic received over the WWAN link at the client node.

Although heterogeneous networks with overlapping wireless technologies may introduce difficulties for each other, such as interference, the heterogeneous nature of the networks can be used to overcome some problems, such as WWAN link bandwidth limitations, as well.

SUMMARY

Exemplary embodiments of the invention are directed to systems and method for link aggregation in heterogeneous networks.

In one embodiment, a wireless communication device for communicating via link aggregation in a heterogeneous wireless communication system comprises: logic configured to establish a first communication path between the wireless communication device and a network element; logic configured to discover a peer-to-peer communication link between the wireless communication device and a proxy access terminal, the wireless device and proxy access terminal being separate individual devices; logic configured to establish a second communication path between the wireless communication device and the network element using the discovered peer-to-peer communication link with the proxy access terminal; logic configured to receive data from the network element via both the first and second communication paths; and logic configured to aggregate the received data.

In another embodiment, a method for communicating using a wireless communication device via link aggregation in a heterogeneous wireless communication system, comprising: establishing a first communication path between the wireless communication device and a network element; discovering a peer-to-peer communication link between the wireless communication device and a proxy access terminal, the wireless device and proxy access terminal being separate individual devices; establishing a second communication path between the wireless communication device and the network element using the discovered peer-to-peer communication link with the proxy access terminal; receiving data from the network element via both the first and second communication paths; and aggregating the received data.

In another embodiment, a wireless communication device for communicating via link aggregation in a heterogeneous wireless communication system comprises: means for establishing a first communication path between the wireless communication device and a network element; means for discovering a peer-to-peer communication link between the wireless communication device and a proxy access terminal, the wireless device and proxy access terminal being separate individual devices; means for establishing a second communication path between the wireless communication device and the network element using the discovered peer-to-peer communication link with the proxy access terminal; means for receiving data from the network element via both the first and second communication paths; and means for aggregating the received data.

In another embodiment, a computer-readable storage medium comprises code, which, when executed by a processor, causes the processor to perform operations for communicating using a wireless communication device via link aggregation in a heterogeneous wireless communication system. The computer-readable storage medium comprises: code for establishing a first communication path between the wireless communication device and a network element; code for discovering a peer-to-peer communication link between the wireless communication device and a proxy access terminal, the wireless device and proxy access terminal being separate individual devices; code for establishing a second communication path between the wireless communication device and the network element using the discovered peer-to-peer communication link with the proxy access terminal; code for receiving data from the network element via both the first and second communication paths; and code for aggregating the received data.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
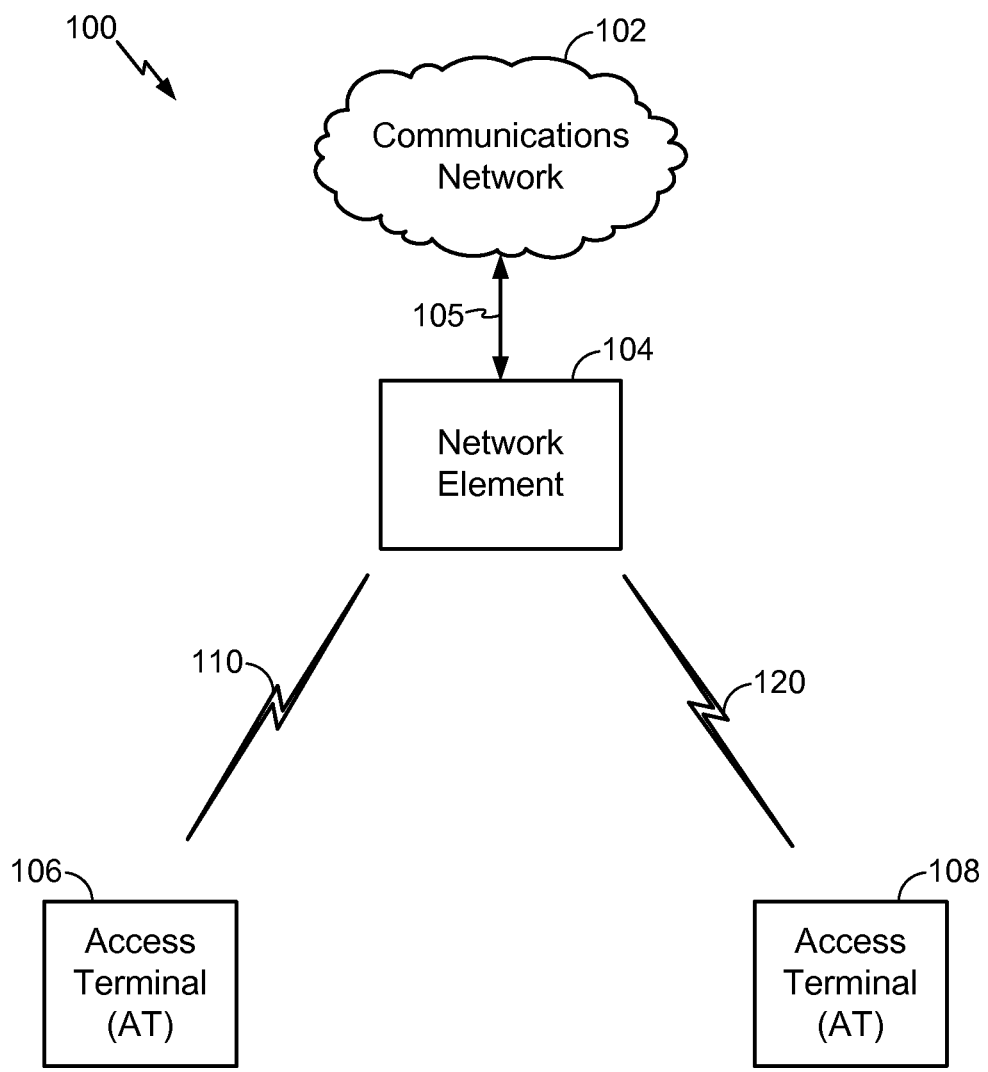
FIG. 1 shows an exemplary high level diagram of a typical wireless communication system.

FIG. 1 shows an exemplary high level diagram of a typical wireless communication system 100. The wireless communication system 100 is described herein for exemplary purposes only in order to facilitate the description of the various aspects disclosed. As shown, the wireless communication system 100 includes access terminals 106 and 108 that communicate with a network element 104 using over-the-air Wireless Wide Area Network (WWAN) links 110 and 120. The network element 104 is connected to a communications network 102 through a network link 105. As used herein, a network element is generally a fixed station or group of stations that communicates with user terminals and may include an access point, a base station, a NodeB, a Radio Network Controller (RNC), an Evolved NodeB (ENodeB), or other elements that are well known in the art. In some instances, a "master" access terminal may act as a network element. Only two access terminals and one network element are shown for illustration purposes. However, it is well known in the art that a typical wireless communications system may have many network elements and terminals. The communication network 102 is anything that facilitates end-to-end communication, and could include, for example, a Public Switched Telephone Network/Integrated Services Digital Network (PSTN/ISDN), Mobile Switching Center (MSC), Digital Subscriber Line (DSL), a server, subscriber databases, Wireless Local Area Network (WLAN), other network elements, Plain Old Telephone Service (POTS), or the Internet. An access terminal could include, but is not limited to, any type of terminal device that provides for wireless communication associated with a wireless communication network. For example, the access terminals 106 and 108 may be a laptop, a Personal Digital Assistant (PDA), or mobile handset. Moreover, an access terminal could function as an access point, thereby allowing peer-to-peer and Ad-Hoc type communications.

In FIG. 1, the access terminal 106 may have one or more applications running on it that utilize the WWAN link 110 with the network element 104. The WWAN link 110 may be limited in the bandwidth it can provide access terminal 106 directly for the application(s) running thereon. This may be true for the downlink as well as for the uplink. Thus, the access terminal 106 may desire more bandwidth than the WWAN link 110 can provide. At the same time in FIG. 1, the access terminal 108 may also be in communication with the network element 104 via the WWAN link 120. The access terminal 108 may be running one or more applications with more than enough bandwidth available over the WWAN link 120.

Figure 2:
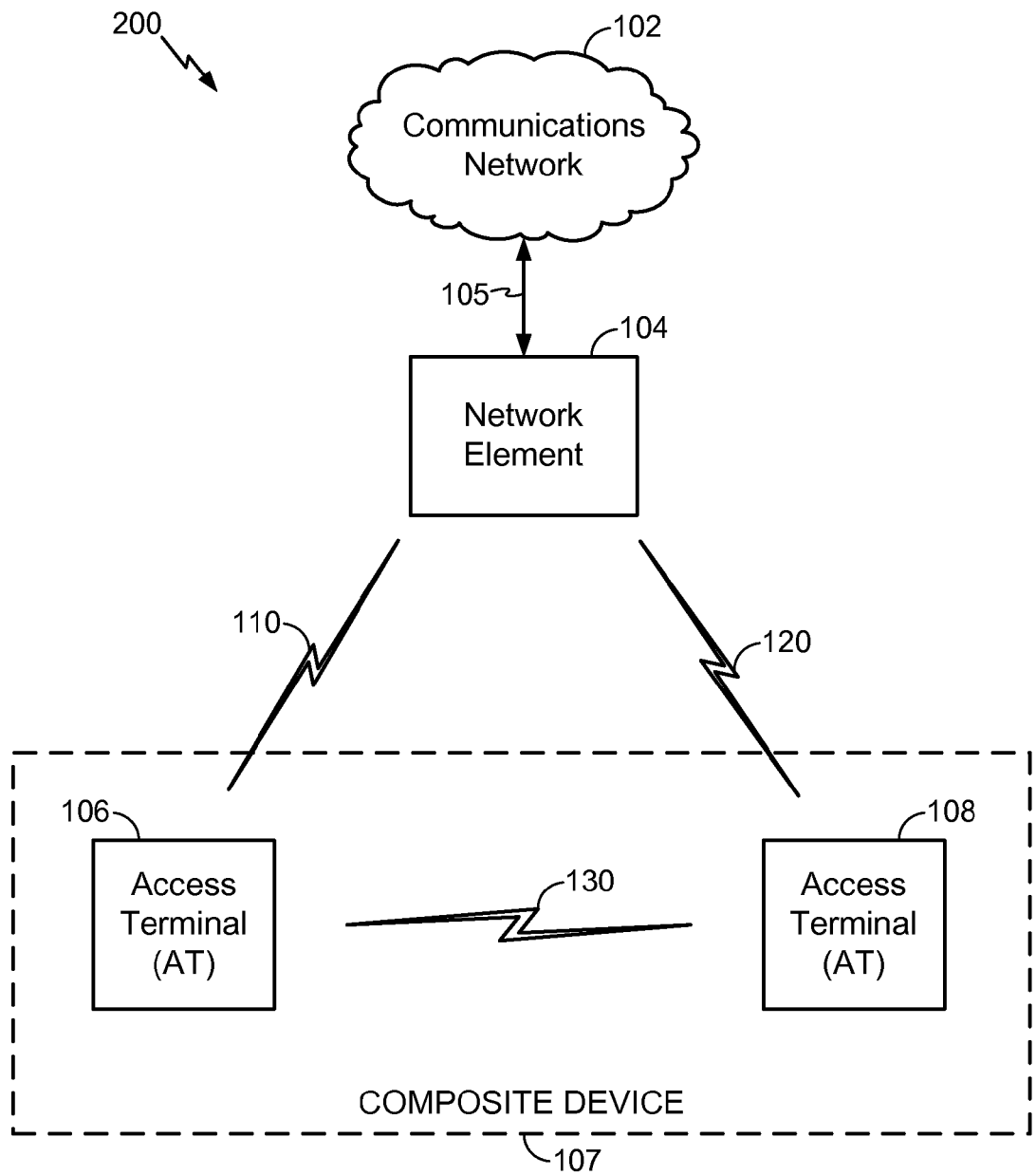
FIG. 2 illustrates a heterogeneous wireless communication system similar to that of FIG. 1, but where the access terminals share an additional communication link.

FIG. 2 illustrates a heterogeneous wireless communication system 200 similar to that of FIG. 1, but where the access terminals 106 and 108 share an additional communication link 130. The additional communication link 130 between the access terminal 106 and the access terminal 108 can be a peer-to-peer wireless link or wired link. The communication system 200 may utilize, for example, Universal Mobile Telecommunication System (UMTS), Bluetooth, Code Division Multiple Access (CDMA), CDMA-2000, Ultra Wide Band (UWB), Wide Band Code Division Multiple Access (W-CDMA), Orthogonal Frequency Division Multiple Access (OFDMA), Multiple Input Multiple Output (MIMO), Evolution-Data Optimized (EV-DO), High Speed Packet Access (HSPA) or High Speed Downlink Packet Access (HSDPA) or High Speed Uplink Packet Access (HSUPA), Long-Term-Evolution (LTE), LTE-Advanced, or International Mobile Telecommunications (IMT) Advanced. It will be appreciated that the communication system 200 is not limited to wireless communication; a wired communication link could also be used.

The network element 104 may communicate with the access terminal 106 over a first wireless channel and with the access terminal 108 over a different wireless channel. For example, the network element 104 may support multiple channels/carriers for HSPA-protocol-based communications or LTE protocol-based communications, where the network element 104 uses a different channel/carrier or different sets of channels/carriers with each access terminal 106, 108. Alternatively, the network element 104 may use the same channel/carrier or sets of channels/carriers with the access terminal 106 and the access terminal 108. In certain embodiments, the network element 104 may constitute a group of elements in a WWAN infrastructure. For example, in UMTS, the network element 104 may constitute both the base-station NodeB and the RNC, where the NodeB and the RNC may be located at different physical locations. Alternatively, in LTE or LTE-Advanced protocols, for example, the network element 104 may constitute an Evolved NodeB (ENodeB) at a single physical location, where the EnodeB supports the functionality of both the NodeB and the RNC in UMTS, along with additional capabilities as required by the LTE/LTE-Advanced protocols.

According to various aspects of the disclosure, downlink WWAN performance is improved by using an aggregate link of multiple paths for delivering data to a WWAN client (e.g., access terminal 106). In FIG. 2, the network element 104 may communicate with the access terminal 106 both directly via the WWAN link 110, and indirectly via the WWAN link 120 and the peer-to-peer link 130. Here, the access terminal 106 is referred to as a "client" access terminal and the access terminal 108 is referred to as a "proxy" access terminal. In some embodiments, the client access terminal 106 and the proxy access terminal 108 present themselves as a single logical device to the network element 104, as well as other WWAN elements, in the form of a composite device 107. In other embodiments, the proxy access terminal 108 merely broadcasts its intent to support traffic for the client access terminal 106 and all access terminals retain their respective identities. The communication path that uses the communication link 110 is referred to as the direct path. The communication path that uses the communication links 120 and 130 is referred to as the indirect path. Communications along these paths may be bidirectional. For downlink flows from the network element 104, a data stream for the client access terminal 106 may be split at the network element 104 along the direct and indirect paths, and merged at the access terminal 106. For uplink flows from the client access terminal 106, a data stream from the client access terminal 106 may be split at the client access terminal 106 along the direct and indirect paths and merged at the network element 104.

Figure 3:
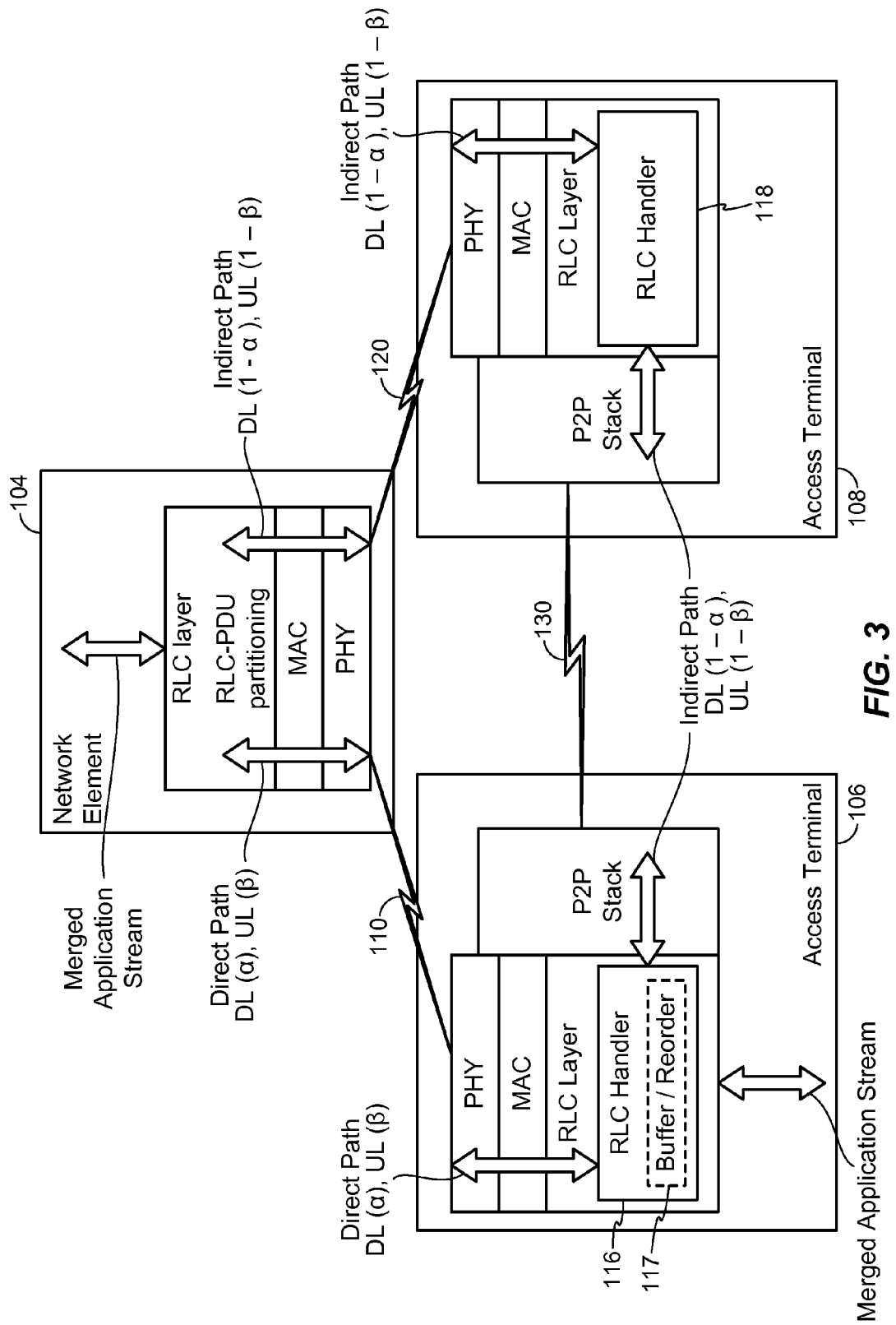
FIG. 3 illustrates example distributed protocol stack processing for partitioning an application stream to use an aggregated link.

FIG. 3 illustrates example distributed protocol stack processing for partitioning an application stream to use an aggregated link. In particular, FIG. 3 includes the network element 104, client access terminal 106, and proxy access terminal 108 of FIGS. 1 and 2, in communication with each other over the WWAN links 110 and 120, and the peer-to-peer link 130. The WWAN link 110 between the network element 104 and the client access terminal 106 is capable of handling a fraction α of the downlink traffic and a fraction β of the uplink traffic corresponding to a desired application stream for the client access terminal 106, due to bandwidth limitations, constraints on the platform architecture, etc. The WWAN link 120 between the network element 104 and proxy access terminal 108, in conjunction with the peer-to-peer link 130 between the proxy access terminal 108 and the client access terminal 106, has sufficient headroom to be capable of handling the remaining fraction (1-α) of the downlink traffic and the remaining fraction (1-β) of the uplink traffic corresponding to the desired application stream for the client access terminal 106.

In FIG. 3, the application stream is partitioned at the RLC layer. That is, the network element 104 schedules a fraction α of corresponding RLC Protocol Data Units (RLC-PDUs) for downlink transmission to the client access terminal 106, and schedules the remaining fraction (1-α) of corresponding RLC-PDUs for downlink transmission to the proxy access terminal 108. Here, the traffic splitting at the network element 104 may be performed by, for example, an RNC in a UMTS system or an ENodeB in an LTE system. The network element 104 uses the MAC/PHY layer processing of the WWAN to transmit the RLC-PDUs to their scheduled access terminal 106, 108. It will be appreciated that the techniques herein relating to RLC-PDUs are equally applicable to Radio Link Protocol (RLP) PDUs in CDMA2000-based technologies.

The proxy access terminal 108 uses an RLC handler 118 to process the fraction (1-α) of the RLC-PDUs received and processed via its PHY/MAC layers. The RLC handler 118 recreates the RLC-PDUs for the client access terminal 106. RLC handler 118 subsequently triggers a peer-to-peer protocol stack to handle forwarding the recreated RLC-PDUs to the client access terminal 106 via the peer-to-peer link 130.

Using an equivalent peer-to-peer protocol stack, the client access terminal 106 receives and decodes the forwarded RLC-PDUs from the proxy access terminal 108. The client access terminal 106 also receives and decodes the fraction α of the RLC-PDUs sent directly from the network element 104 via PHY/MAC/RLC layer processing. The fraction α of the RLC-PDUs from the network element 104 is then merged with the fraction (1-α) of the RLC-PDUs from the proxy access terminal 108 by the client access terminal 106 using its own RLC handler 116 to create a single, merged application stream.

Uplink traffic is handled in a complementary manner. A fraction β of RLC-PDUs is transmitted directly to the network element 104 by the client access terminal 106 over the WWAN link 110, and the remaining fraction (1-β) is transmitted over the peer-to-peer link 130. The RLC handlers 116, 118 exchange the RLC PDUs over the peer-to-peer link 130. Any RLC-PDUs received over the peer-to-peer link 130 by the proxy access terminal 108 are then transmitted over the WWAN link 120, received by the network element 104, determined to be RLC-PDUs for the client node 106, and merged with the other RLC-PDUs arriving directly from the client access terminal 106 over the WWAN link 110. The merged application stream is then forwarded to higher level nodes in the WWAN infrastructure, and may be subsequently relayed through the appropriate packet data network (PDN) gateway to a desired destination on the Internet, for example.

Despite intelligent queue management to deliver traffic on different paths with differential delays, a skew may arise between the paths where the PDUs and corresponding packets being received are out of order. A higher layer transport protocol such as TCP can trigger a congestion control mechanism, for example, if an IP packet (n) is not received but IP packets (n+1), (n+2), and (n+3) are received. Congestion control generally results in reduced bandwidth for the system. In some embodiments, the RLC handler 116 includes a buffering and reordering module 117, as shown in FIG. 3, to explicitly handle out-of-order PDUs from the different communication paths and deliver them in the correct order to the upper layers of the protocol stack executing on the client access terminal 106. A primary sequencing of PDUs may be used by the buffering and reordering module 117, whereas a secondary sequencing may be used for each of the direct and indirect communication paths between the network element 104 and the client access terminal 106. A similar buffering and ordering module (not shown) may be provided at the network element 104 when link aggregation is used for uplink traffic as well.

In addition to RLC layer partitioning, the application stream may also be split by the network element 104 in other ways to achieve link aggregation. For example, the application stream may be partitioned at the IP layer. Here, the proxy access terminal 108 may process the WWAN PHY/MAC/RLC/PDCP/IP layers and forward IP packets to the client access terminal 106 over the peer-to-peer link 130. The client access terminal 106 can then aggregate the two IP streams and complete further processing.

When the client access terminal 106 and the proxy access terminal 108 form a composite device 107, they can use a single, composite identity to facilitate communication with the network element 104. The composite identity can be the same as the identity of the client access terminal 106, for example, or a new identity. The network element 104 can then treat the composite device 107 as a single access terminal with multiple WWAN modems, and direct traffic accordingly. Thus, the composite device 107 provides the ability to receive and transmit using the WWAN modems of each access terminal 106, 108, while preserving some of the simplicities associated with single device communication. For example, in a multi-carrier capable system, the network element 104 can treat the composite device 107 as a single terminal with multiple assigned carriers. In general, the client access terminal 106 may utilize $K_{d,0}$ and $K_{u,0}$ carriers ($K_{d,0} \geq 1$, $K_{u,0} \geq 1$) to communicate directly with the network element 104 on the downlink and uplink, respectively. Similarly, each proxy access terminal (e.g., 108) may utilize $K_{d,i}$ and $K_{u,i}$ carriers ($K_{d,i} \geq 1$, $K_{u,i} \geq 1$) to communicate with the network element 104 on the downlink and uplink, respectively. Therefore, the total number of carriers available for use by the client access terminal 106 may be increased to ($K_{d,0} + \Sigma_i K_{d,i}$) carriers for the downlink and ($K_{u,0} + \Sigma_i K_{u,i}$) carriers for the uplink via the composite device 107.

Alternatively, the composite device 107 can present multiple identities to the network element 104 to facilitate direct traffic splitting across the constituent access terminals 106, 108. In some embodiments, the composite device 107 may present itself using a composite identity to the network element 104 with two different identity components, one that represents the client access terminal 106 and one that represents the proxy access terminal 108. The different identity components can be used by the network element 104 to explicitly communicate WWAN traffic with a particular access terminal 106, 108.

Depending on the dynamic needs of the client access terminal 106, some or all of the available channels/carriers may be selectively employed for client access terminal 106 traffic. The choice of channels/carriers may be based on, for example, the throughput performance available on each of the channels/carriers, the delay associated with transporting data using the channels/carriers, and/or the performance/delay constraints of the peer-to-peer link 130 between the client access terminal 106 and the proxy access terminal 108.

Figure 4:
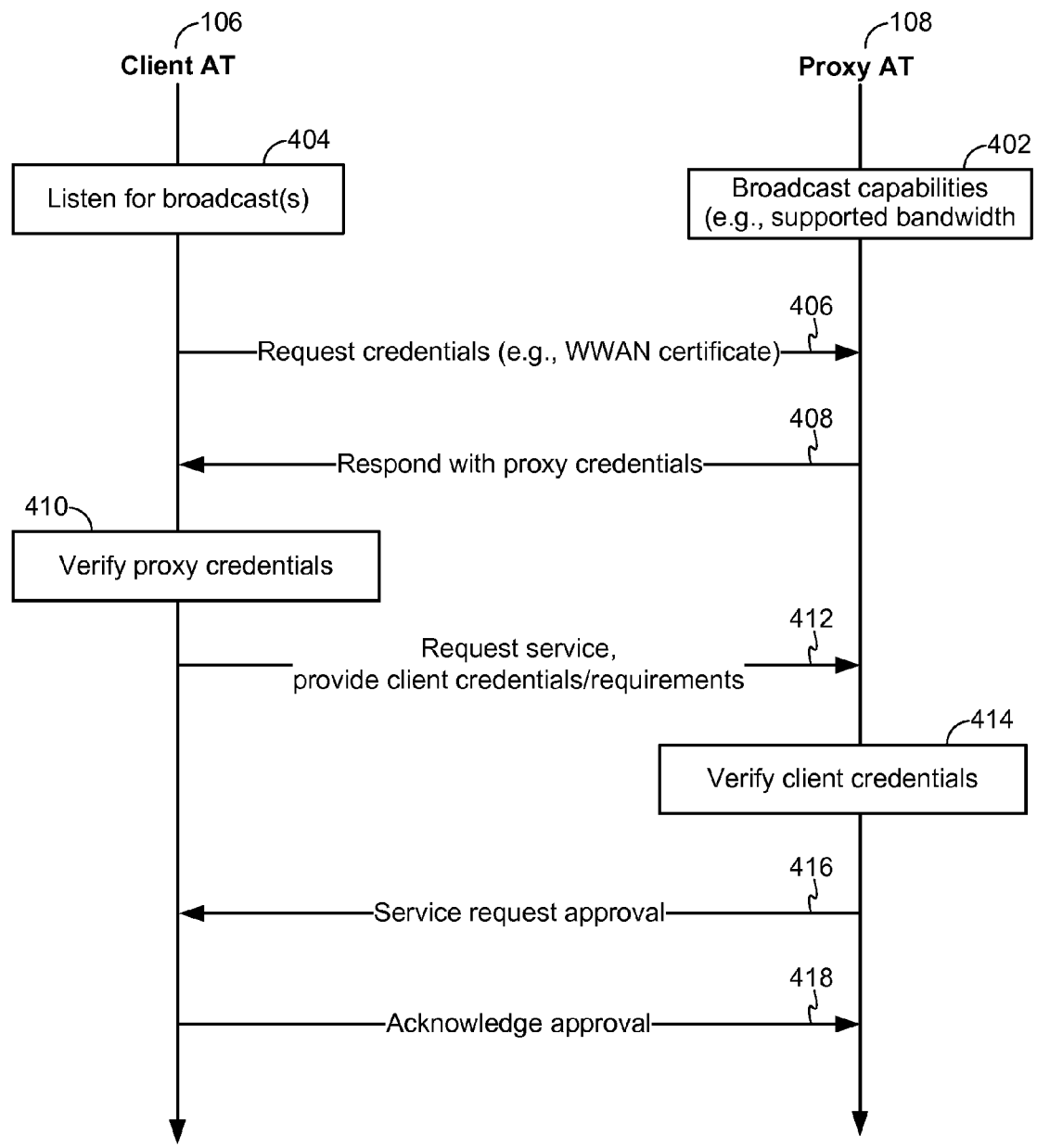
FIG. 4 illustrates an example call flow diagram for discovering link aggregation services.

FIG. 4 illustrates an example call flow diagram for discovering link aggregation services. Here, the client access terminal 106 and the proxy access terminal 108 discover each other and establish trust over the peer-to-peer link 130 (e.g., Bluetooth). When the client access terminal 106 comes within sufficient wireless proximity of the proxy access terminal 108, it is able to detect a broadcast message 402 from the proxy access terminal 108 identifying its capabilities (e.g., supported bandwidth). In some embodiments, the proxy access terminal 108 may choose to support more than one client access terminal 106. Here, the proxy access terminal 108 may advertise a fractional amount of bandwidth/resources for each client access terminal 106, and reserve the remaining bandwidth/resources for its own processing.

The client access terminal 106 discovers 404 the proxy access terminal's 108 capabilities and queries 406 the proxy access terminal 108 for credentials (e.g., a WWAN certificate). The proxy access terminal 108 responds 408 with its credentials. If the supplied credentials can be verified 410, the client access terminal 106 then queries 412 the proxy access terminal 108 for service, and provides 412 its own credentials (e.g. a WWAN certificate) and communication requirements (e.g., required bandwidth). The proxy access terminal 108 verifies 414 the client access terminal's 106 credentials and responds 416 with a service request approval indication. If the service request is approved, the client access terminal 106 acknowledges 418 receipt of approval. Alternatively, the credential verification process may involve interaction with the WWAN and one or more authentication servers.

To facilitate enabling of link aggregation services, the access terminals 106 and 108 may be preconfigured to trust each other. In some embodiments, the access terminals 106 and 108 are devices that are owned by the same user or company, or are otherwise in affiliation with each other (e.g., an individual's laptop, cell phone, personal car WWAN modem, personal wall-plugged assisting WWAN modem, home FemtoCell, etc.). In one example, the client access terminal 106 may be the user's cellular phone (or other wireless handset) and the proxy access terminal 108 may be a personal car WWAN modem in the user's vehicle. The cellular phone and car WWAN modem may form a single composite device 107 to facilitate link aggregation services. The access terminals 106 and 108 may belong to one user, sharing a WWAN data service plan with a single provider, where such a service plan allows various devices to use their WWAN connectivity simultaneously. Alternatively, the access terminals 106 and 108 could have separate WWAN data service plans. In one aspect, using devices that are commonly controlled facilitates the establishment and use of the peer-to-peer link 130 between the devices (e.g., access, authentication, trust, etc.). Once trust is established, the client access terminal 106 and the proxy access terminal 108 are then ready to enable link aggregation services.

Figure 5:
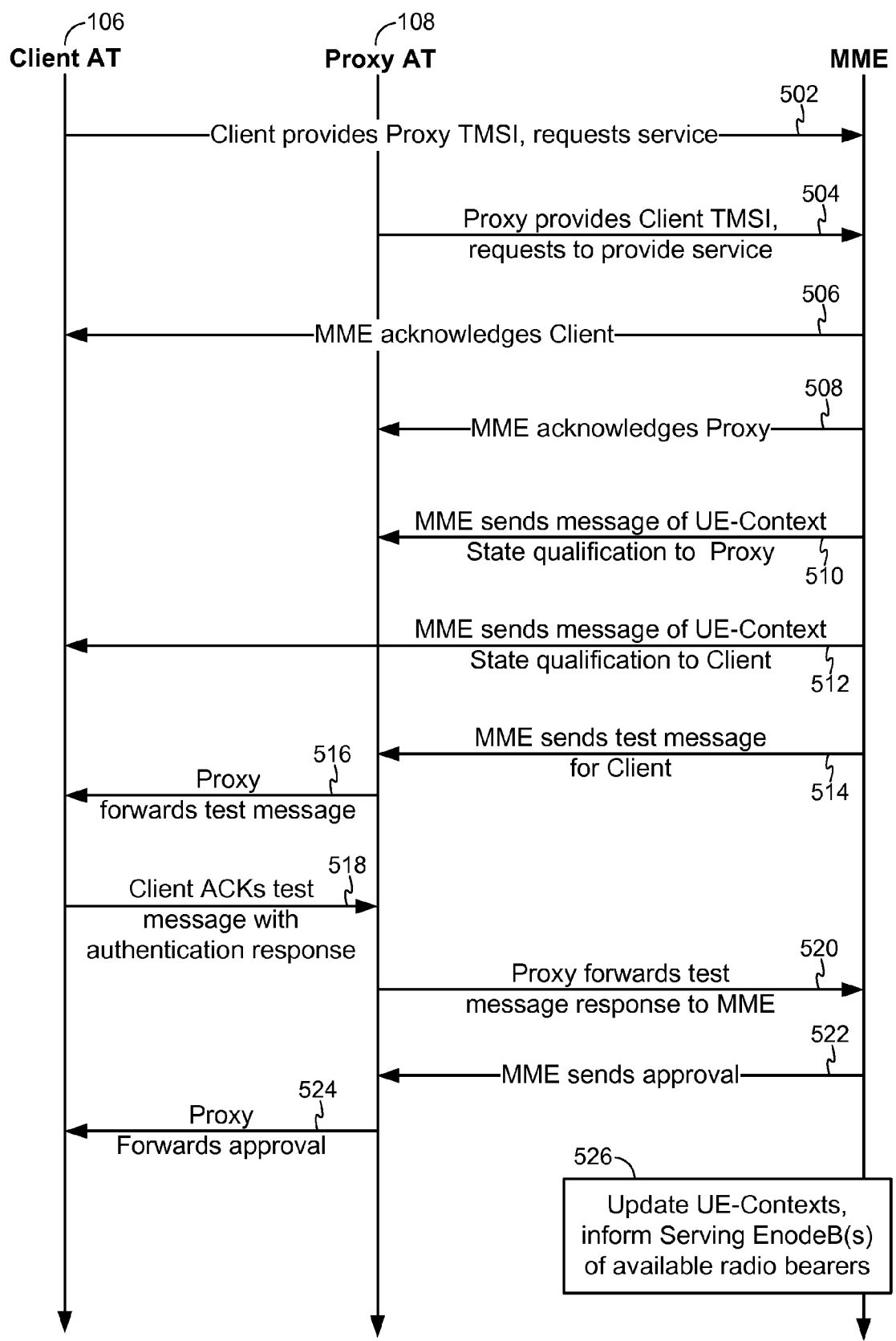
FIG. 5 illustrates an example call flow diagram for enabling link aggregation services.

FIG. 5 illustrates an example call flow diagram for enabling link aggregation services. Here, the access terminals 106, 108 enable link aggregation services via a third party management entity, such as a Mobile Management Entity (MME) commonly used in LTE systems. Among other functions, an MME typically receives User Equipment (UE) Context information from various access terminals and provides support for bearer establishment, terminal capabilities, a dynamic list of bearers, tracking area updates, and release and propagation of UE information in the access network. With reference to FIG. 2, the MME may form part of the network element 104, or may be located elsewhere in the communications network 102. In this example, the conventional UE-Context provided to the MME by the access terminals 106, 108 is enhanced (e.g., to indicate Client and Proxy Temporary Mobile Subscriber Identities (TMSIs)) to enable the proxy access terminal 108 to provide WWAN service for the client access terminal 106.

Referring back to FIG. 5, the client access terminal 106 provides 502 the MME with the TMSI of the proxy access terminal 108 and requests 502 service, while the proxy access terminal 108 provides 504 the MME with the TMSI of the client access terminal 106 and requests 504 to provide service. The client access terminal 106 and the proxy access terminal 108 may exchange their TMSI's beforehand over the peer-to-peer link 130. The MME acknowledges 506, 508 both access terminals 106, 108. The MME then sends 510 a message qualifying the UE-Context state of the client access terminal 106 to the proxy access terminal 108, and sends 512 a message qualifying the UE-Context state of the proxy access terminal 108 to the client access terminal 106.

Subsequently, the MME sends 514 a test message that encapsulates an authentication request for the client access terminal 106 to the proxy access terminal 108, which attempts to forward 516 the test message to the client access terminal 106. If the test message is successful, the client access terminal 106 acknowledges 518 the test message with an authentication response to the proxy access terminal 108, which then forwards 520 the test message response to the MME. If the MME receives the correct response from the client access terminal 106, the MME sends 522 an approval to the proxy access terminal 108, and the proxy access terminal 108 forwards 524 the approval to the client access terminal 106. For approved links, the MME adds 526 the proxy access terminal 108 TMSI to the client access terminal 106 UE-Context, and similarly adds 526 the client access terminal 106 TMSI to the proxy access terminal 108 UE-Context. The MME then pushes 526 the updated information to the Serving ENodeB (s) (e.g., the network element 104) for the client access terminal 106 and the proxy access terminal 108, to enable them to use the proxy access terminal's 108 WWAN link for the client access terminal 106. In some embodiments, the MME relays a single TMSI for the composite device 107 to the Serving ENodeB(s).

While the MME may approve the use of the radio bearers of the proxy access terminal 108 for traffic associated with the client access terminal 106, the actual splitting of the traffic may occur downstream in the WWAN infrastructure relative to the MME, such as at the RNC/NodeB (in UMTS) or ENodeB (in LTE) as described above in relation to FIG. 3. In cases where only the new indirect path is used, the MME can tear down client access terminal 106 radio bearers, and the client access terminal 106 can shut off its WWAN radio. This is referred to as the "WWAN Communicator" mode for the proxy access terminal 108. In cases where the full link aggregation mode is used, the MME may keep the client access terminal 106 radio bearers active and additionally use the proxy access terminal 108 radio bearers when desired.

In some embodiments, the different radio bearers for the proxy access terminal 108 may carry distinct flows such that certain radio bearers carry flows for local termination at the proxy access terminal 108 and other radio bearers carry flows that need to be communicated to the client access terminal 106. In this way, the proxy access terminal 108 can distinguish between the different traffic it receives on its radio bearers. In other embodiments, common radio bearers are used for both flows that terminate locally and flows that need to be communicated to the client access terminal 106. Here, additional information is included in each flow to differentiate between their destinations, such as a different IP address, a flow identifier, a port number, a tunneling endpoint address in the header, etc.

Figure 6:
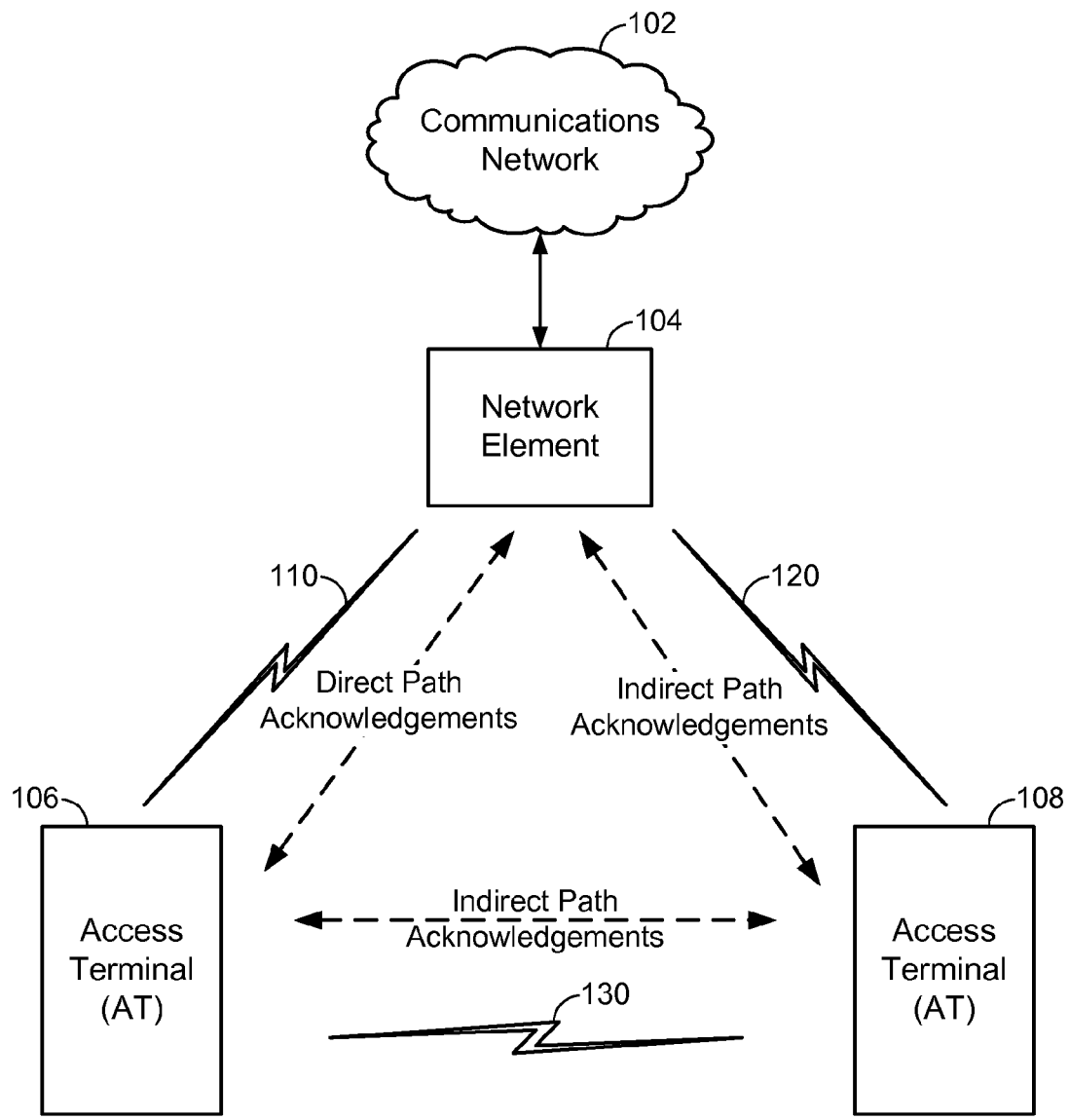
FIG. 6 illustrates an access network configured for both direct path and indirect path acknowledgements of client traffic.

For traffic flows that require acknowledgements, such as Acknowledgement (ACK) and Negative Acknowledgement (NACK) messages, the acknowledgements can be provided in a variety of ways. FIG. 6 illustrates an access network configured for both direct path and indirect path acknowledgements of client traffic. Direct path acknowledgements are sent via the WWAN link 110. Indirect path acknowledgements are sent via the WWAN link 120 in conjunction with the peer-to-peer link 130. In some embodiments, all acknowledgements are sent along the direct path, including acknowledgements for traffic received along the direct path as well as traffic received along the indirect path. In other embodiments, acknowledgements are sent along the path over which the corresponding traffic is received. That is, acknowledgements for traffic received along the direct path are sent along the direct path and acknowledgements for traffic received along the indirect path are sent along the indirect path. In still other embodiments, all acknowledgements are sent along the indirect path, including acknowledgements for traffic received along the indirect path as well as traffic received along the direct path. In still other embodiments, acknowledgements are sent along the opposite path from the path over which the corresponding traffic is received. That is, acknowledgements for traffic received along the direct path are sent along the indirect path and acknowledgements for traffic received along the indirect path are sent along the direct path.

As mentioned above, the client access terminal 106 may form peer-to-peer links with more than one proxy access terminal 108 to further increase the effective throughput for transmissions between the client access terminal 106 and the WWAN infrastructure.

Figure 7:
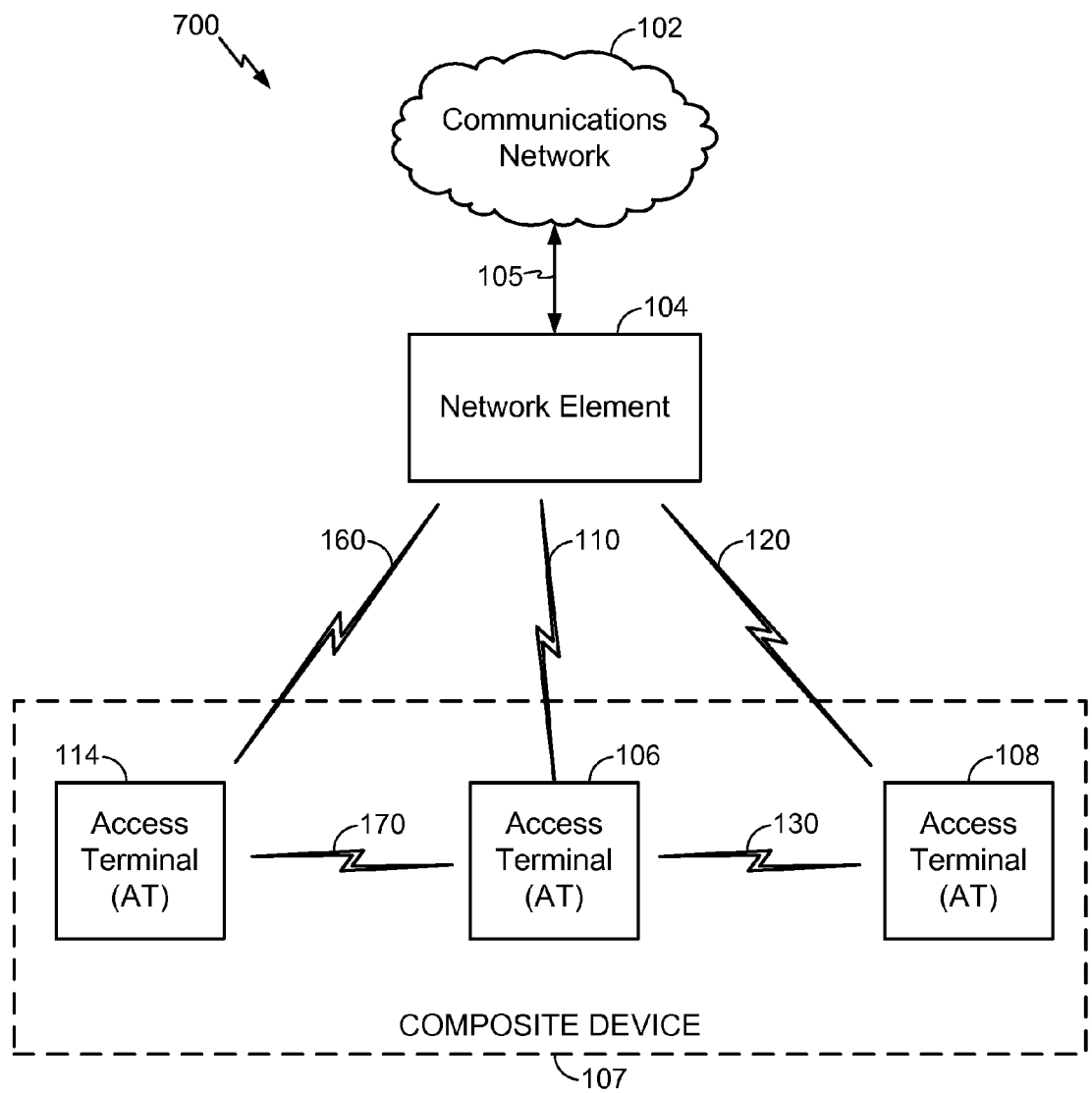
FIG. 7 illustrates link aggregation in an example network arrangement including multiple proxy access terminals in communication with the client access terminal.

FIG. 7 illustrates link aggregation in an example network arrangement including multiple proxy access terminals in communication with the client access terminal. In particular, FIG. 7 illustrates a wireless communication system 700 including the communications network 102, network element 104, client access terminal 106, and proxy access terminal 108 of FIG. 2, each variously connected by the network link 105, the WWAN links 110 and 120, and the peer-to-peer link 130. The wireless communication system 700 further includes a second proxy access terminal 114 in communication with the network element 104 via another WWAN link 160 and in communication with the client access terminal 106 via another peer-to-peer link 170. The second proxy access terminal 114 provides an additional indirect path using the communication links 160 and 170 for traffic flow between the network element 104 and client access terminal 106. This additional indirect path may operate similar to, and in parallel with, the indirect path provided by the first proxy access terminal 108 as described above. Further, the second proxy access terminal 114 may participate in forming the composite device 107, as shown. It will also be appreciated that while one additional proxy access terminal 114 is shown in FIG. 7 for illustration purposes, the techniques provided herein may be generalized to any number of additional proxy access terminals/indirect paths in other embodiments.

The link aggregation techniques disclosed herein may also employ more than one network element 104, or more than one access point within the network element 104. The multiple network elements/access points may be used to support the different access terminals 106, 108, 114 when they are in different coverage zones of the communications network 102. Alternatively, in some embodiments, the access terminals 106, 108, 114 may have different capabilities in terms of the protocols that they are configured to use to communicate with the network. For example, the client access terminal 106 may have a W-CDMA and a HSPA modem, whereas the proxy access terminal 108 may have an LTE modem. When the access terminals 106, 108, 114 have different capabilities supported by their respective modems, more than one network element 104 can be used to deliver traffic to the composite device 107. The different network elements can support the different WWAN protocols of the respective access terminals 106, 108, 114 forming the composite device 107.

Figure 8A:
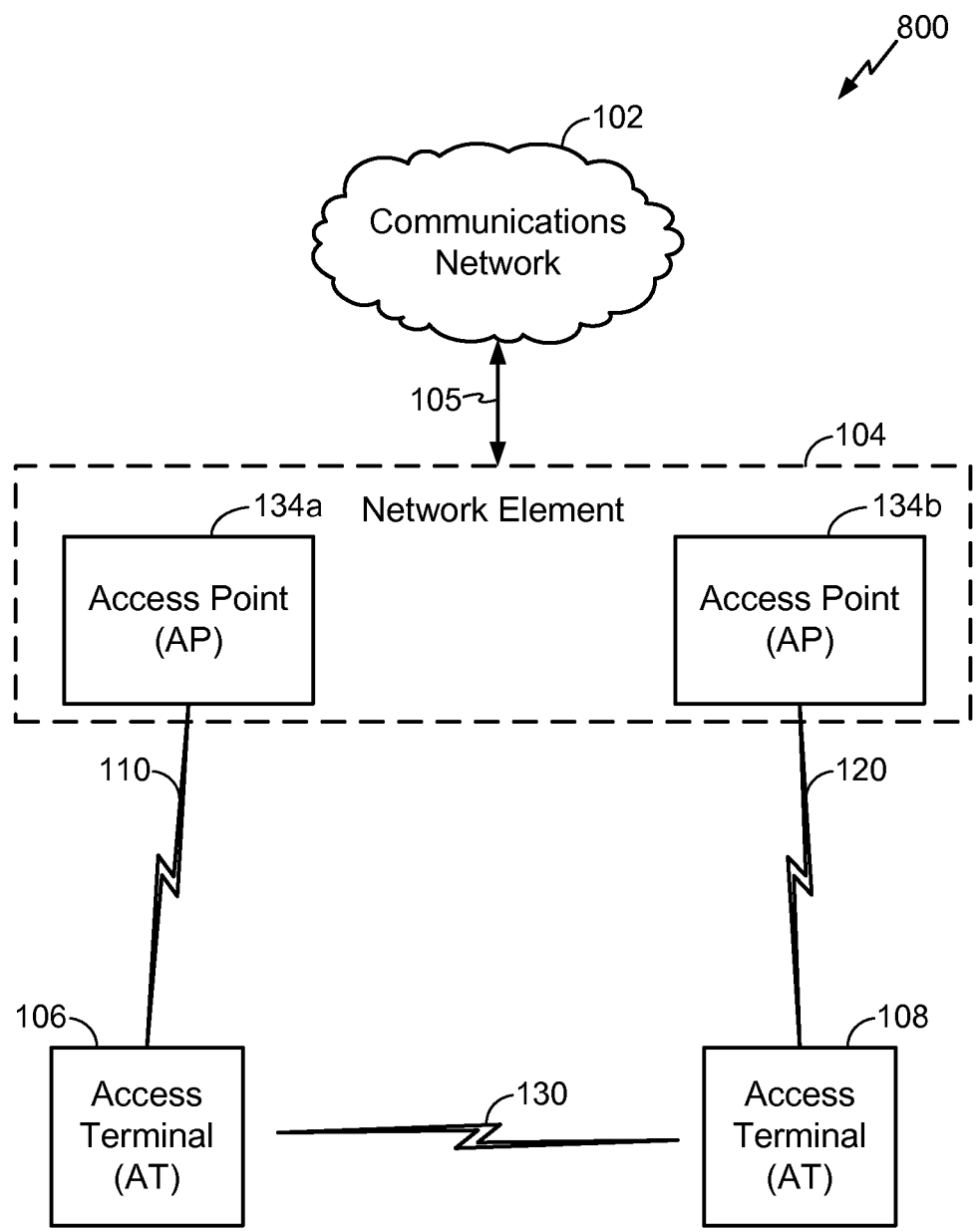
FIGS. 8A and 8B illustrate link aggregation in example network arrangements where a proxy access terminal is in communication with a different access point or network element than a client access terminal.
Figure 8B:
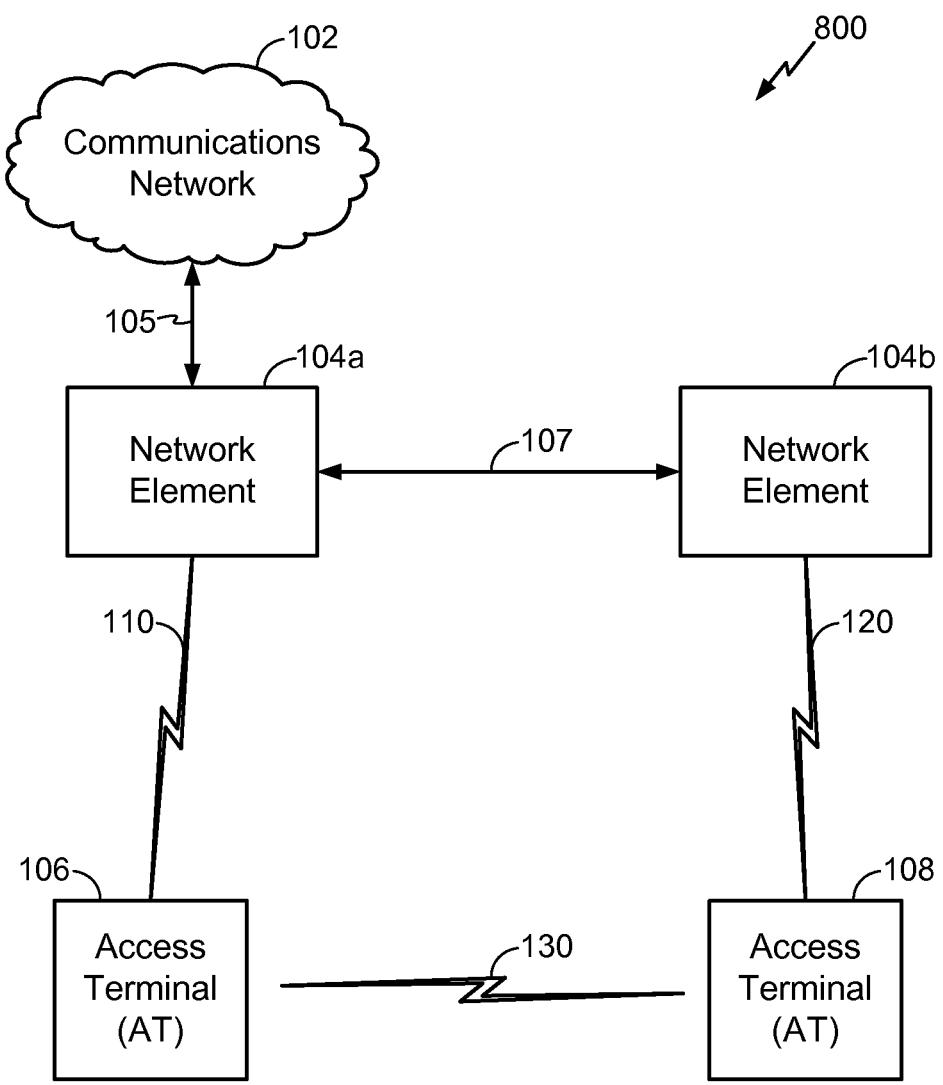

FIGS. 8A and 8B illustrate link aggregation in example network arrangements where a proxy access terminal is in communication with a different access point or network element than a client access terminal.

The wireless communication system 810 shown in FIG. 8A illustrates an example network element 104 including two separate access points 134a and 134b, operating in conjunction with potentially other entities to coordinate traffic stream splitting for the client access terminal 106. The network element 104 may be part of a UMTS Terrestrial Radio Access Network (UTRAN) in a UMTS communication system, for example, and further include a Radio Network Controller (RNC) (not shown) controlling each of the access points 134a and 134b (referred to as NodeBs in UMTS). In this case, downlink traffic is split and uplink traffic is combined by the RNC for the two NodeBs. The second access point 134b will be referred to in this illustration as a proxy access point 134b to distinguish it from the client access point 134a. Accordingly, the network element 104 is connected to the communications network 102 through a network link 105, and is in communication with the client access terminal 106 via the WWAN link 110, managed by the client access point 134a, as well as the proxy access terminal 108 via the WWAN link 120, managed by the proxy access point 134b. The proxy access terminal 108 and the client access terminal 106 are in communication with each other via the peer-to-peer link 130, as in the design of FIG. 2.

In some embodiments, the client and the proxy access points may be at different network elements. In the wireless communication system 820 shown in FIG. 8B, the proxy access terminal 108 continues to communicate with the client access terminal 106 via the peer-to-peer link 130, but the client access terminal 106 is connected to a first network element 104a via the WWAN link 110 while the proxy access terminal 108 is connected to a second network element 104b via the WWAN link 120. The second network element 104b will be referred to in this illustration as a proxy network element 104b to distinguish it from the client network element 104a. As described above, in some embodiments each network element 104a, 104b may be a combination of an RNC and one or more NodeBs, such as in a UMTS system. In other embodiments, the network elements 104a, 104b may each be an EvolvedNodeB (EnodeB), such as in an LTE system. In still other embodiments, there may be a mix of RNC/NodeBs and EnodeBs. The proxy access terminal 108 is not in direct communication with the client network element 104a. Instead, a tunnel 107 is established between the client network element 104a and the proxy network element 104b to facilitate traffic splitting by forwarding traffic between the respective network elements 104a, 104b that serve the client and the proxy access terminals 106, 108, respectively. The tunnel 107 may be setup using any desired tunneling protocol to link the two network elements 104a, 104b over a given communication path. In this case, the indirect path for client traffic uses the tunnel 107, the communication link 120, and the communication link 130.

Each indirect path, and in particular paths that use tunneling, may introduce a delay as compared to the direct path. In a multi-carrier system, for example, when the client access terminal 106 uses more than one carrier on its direct link with the network element 104, an inter-carrier skew may arise on those carriers depending on the delay to transport data over each carrier, the utilization of each carrier, scheduling constraints for each carrier, and delays associated with the network paths in the WWAN for the traffic associated with each carrier. When the proxy access terminal 108 additionally provides support for the client access terminal 106 for traffic associated with the client access terminal 106, a further inter-carrier inter-terminal skew (Td) may arise between the carriers associated with the client access terminal 106 and the carriers associated with the proxy access terminal 108. The inter-carrier inter-terminal skew Td reflects the average inter-carrier skew (D1) between the carriers for the access terminals 106, 108 and the peer-to-peer link delay (D2) over the peer-to-peer link 130 between the access terminals 106, 108. Inter-carrier skew delays D1 can be on the order of a few 10s of milliseconds to several 10s of milliseconds, for example (e.g., approximately 20 ms to 200 ms). The peer-to-peer link delays D2 can be on the order of a few 10s of milliseconds, for example (e.g., approximately 20 ms to 40 ms).

The effective inter-carrier inter-terminal skew Td may be determined from D1+D2 or |D1−D2|, depending on whether the peer-to-peer link delay D2 exacerbates the inter-carrier delay or compensates for the inter-carrier delay. For example, if there is an additional positive delay D1 to deliver traffic over the WWAN to the client access terminal 106 relative to delivery of traffic over the WWAN to the proxy access terminal 108, then the inter-carrier inter-terminal skew Td is approximately |D1−D2|. However, if there is an additional positive delay D1 to deliver traffic over the WWAN to the proxy access terminal 108 relative to delivery of traffic over the WWAN to the client access terminal 106, then the inter-carrier inter-terminal skew Td is approximately D1+D2.

When different WWAN technologies are used for the different modems of the various access terminals 106, 108, 114, the differential delays may be even higher depending on the different WWAN components utilized to deliver downlink traffic to each of the access terminals 106, 108, 114. The same may be true for uplink traffic.

Figure 9:
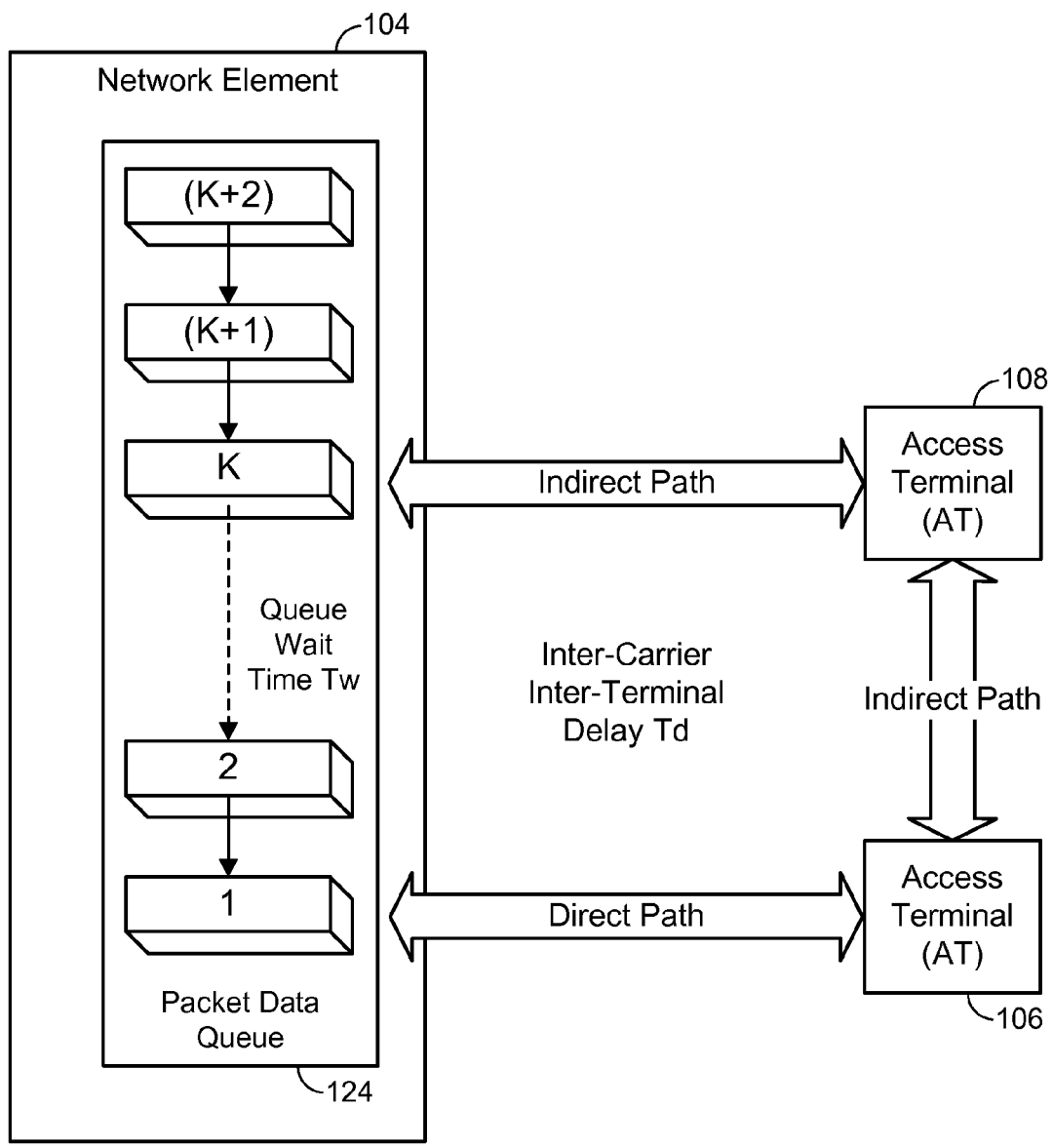
FIG. 9 illustrates an early selection mechanism at the network element to accommodate for delays on the indirect path.

FIG. 9 illustrates an early selection mechanism at the network element to accommodate for delays on the indirect path. In this example, it is assumed that the indirect path incurs a longer delay relative to the direct path. Here, the network element 104 selects one or more PDUs from a packet data queue 124 for early transmission to the proxy access terminal 108. For example, the Kth PDU in the queue 124 may be selected for transmission such that the wait time in the queue 124 (Tw) matches the inter-carrier inter-terminal delay Td, as closely as practical. This helps to ensure that PDUs over the indirect path arrive in time at the client access terminal 106 relative to the arrival of PDUs over the direct path. Additional delays may also be incorporated into determining the appropriate point in the queue 124 to begin early transmission, such as delays associated with the tunnel 107 of FIG. 8. Alternatively, if the direct path has a longer delay relative to the indirect path, then the early selection of PDUs may be performed on the direct path. Equivalently, if there is a buffered set of packets ready for transmission on either path, then a delayed transmission strategy may be adopted for the path which has a shorter delay.

In some embodiments, sub-flows may be used in heterogeneous WWAN link aggregation. Sub-flows may be created at a higher protocol stack layer (e.g., at a layer above the IP layer) relative to the protocol stack layer at which the flows are physically separated (e.g., at the RLC layer). In such a case, the layer that creates the sub-flows adds an index pertaining to a specific sub-flow to the packet header, so that a lower layer can use such an index to separate the sub-flows. Information related to the sub-flow index can be preserved in lower-layer packet headers as the lower layer packet headers are created during processing, so that the lower layer that physically partitions the stream into different paths has access to the sub-flow index. Alternatively, a deep packet inspection can be used to determine the sub-flow index by inspecting an upper-layer packet header. The processing of these different layers may occur at different nodes in the WWAN infrastructure for downlink traffic destined to the client access terminal 106, and the downlink traffic is merged at the client access terminal 106. The partitioning for the uplink traffic from the client access terminal 106 is typically performed at the client access terminal 106 itself.

In addition to partitioning at the Access Stratum of the WWAN infrastructure, such as at the network element 104 as illustrated in FIG. 3, the application stream may be split at other network elements to achieve link aggregation. For example, the application stream may be partitioned at the IP layer upstream of the network element 104, by other network elements, such as by a local tunneling anchor node, or by a remote tunneling node server. Accordingly, in certain other embodiments, the network element used for traffic splitting can be a multimedia source on the Internet, such that the traffic is split directly at the source.

Figure 10:
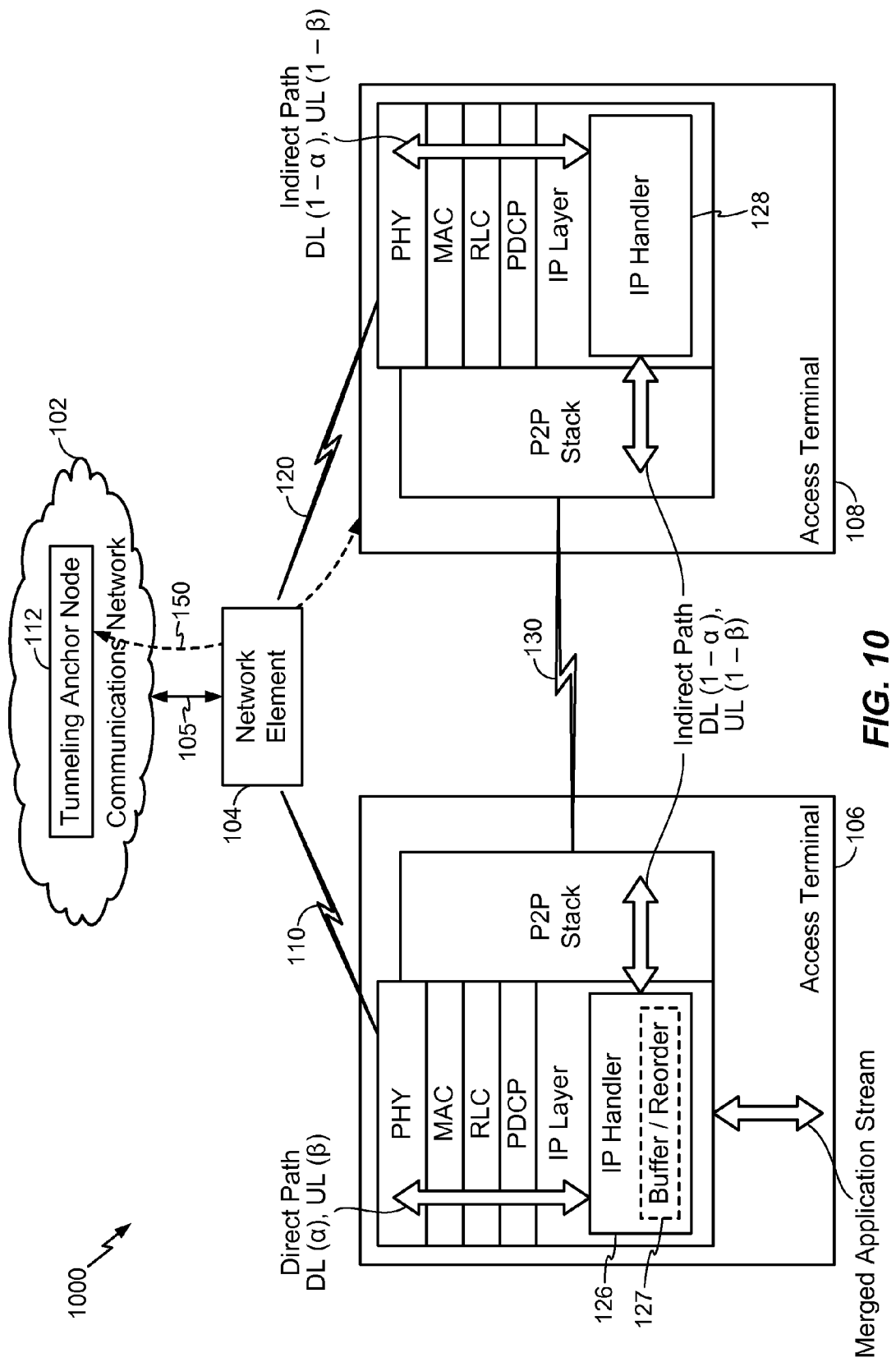
FIG. 10 illustrates an example IP layer link aggregation scheme using a tunneling anchor node.

FIG. 10 illustrates an example IP layer link aggregation scheme using a tunneling anchor node. In particular, FIG. 10 illustrates a wireless communication system 1000 including the communications network 102, network element 104, client access terminal 106, and proxy access terminal 108 of FIG. 2, each variously connected by the network link 105, the WWAN links 110 and 120, and the peer-to-peer link 130. The wireless communication system 700 further includes a tunneling anchor node 112 forming part of the communications network 102. The tunneling anchor node 112 may be part of a Gateway GPRS Support Node (GGSN), for example, or another network entity.

As in the scenario described above with reference to FIG. 3, here the WWAN link 110 between the network element 104 and the client access terminal 106 is capable of handling a fraction α of the downlink traffic and a fraction β of the uplink traffic corresponding to a desired application stream for the client access terminal 106, due to bandwidth limitations, constraints on the platform architecture, etc. The WWAN link 120 between the network element 104 and proxy access terminal 108, in conjunction with the peer-to-peer link 130 between the proxy access terminal 108 and the client access terminal 106, has sufficient headroom to be capable of handling the remaining fraction (1-α) of the downlink traffic and the remaining fraction (1-β) of the uplink traffic corresponding to the desired application stream for the client access terminal 106.

For downlink traffic, the tunneling anchor node 112 splits incoming IP packets for the client access terminal 106 into a fraction α to be transmitted over a direct path to the client access terminal 106, and a remaining fraction (1-α) to tunneled over an indirect path to the proxy access terminal 108 before being subsequently forwarded to the client access terminal 106. The direct path traffic includes IP packets sent directly over the network link 105 and WWAN link 110. The indirect path traffic includes IP packets tunneled by the tunneling anchor node 112 over a tunnel path 150 including the network link 105 and WWAN link 120, and forwarded by the proxy access terminal 108 to the client access terminal 106 via the peer-to-peer link 130. The available performance capability information may be transmitted to the tunneling anchor node 112 by the two access terminals 106, 108 so that the tunneling anchor node 112 can split the IP stream accordingly. In other embodiments, the tunneling anchor node 112 may split the IP stream based on the relative performance capabilities of each link.

The proxy access terminal 108 uses an IP handler 128 to unwrap the tunneling information of the fraction (1-α) of IP packets received and processed via its PHY/MAC/RLC/PDCP layers. The IP handler 128 subsequently triggers a peer-to-peer protocol stack to handle forwarding the unwrapped IP packets to the client access terminal 106 via the peer-to-peer link 130. Similar to the RLC handler 116 of FIG. 3, the IP handler 126 may include a buffer and reordering module 127 to handle out-of-order packets from the different communication paths and deliver them in the correct order to the upper layers of the protocol stack executing on the client access terminal 106.

Using an equivalent peer-to-peer protocol stack, the client access terminal 106 receives and decodes the forwarded IP packets from the proxy access terminal 108. The client access terminal 106 also receives and decodes the fraction α of IP packets sent directly from the network element 104 via PHY/MAC/RLC/PDCP/IP layer processing. The fraction α of the IP packets from the network element 104 is then merged with the fraction (1-α) of the IP packets from the proxy access terminal 108 by the client access terminal 106 using its own IP handler 126 to create a single, merged application stream.

Uplink traffic is handled in a complementary manner. A fraction β of IP packets is transmitted to the tunneling anchor node 112 via the network element 104 by the client access terminal 106 over the WWAN link 110 and network link 105, and the remaining fraction (1-β) is transmitted over the peer-to-peer link 130. The IP handlers 126, 128 exchange IP packets over the peer-to-peer link 130. Any IP packet received over the peer-to-peer link 130 by the proxy access terminal 108 is then encapsulated with a tunneling wrapper and tunneled to the tunneling anchor point 112 via the network element 104 over the WWAN link 120 and network link 105. The tunneling anchor point 112 merges the IP packets arriving directly from the client access terminal 106 and the IP packets tunneled from the proxy access terminal 108 to form a merged application stream. The merged application stream is then forwarded to higher level nodes in the WWAN infrastructure, and may be subsequently relayed through the appropriate PDN gateway to a desired destination on the Internet, for example.

Figure 11:
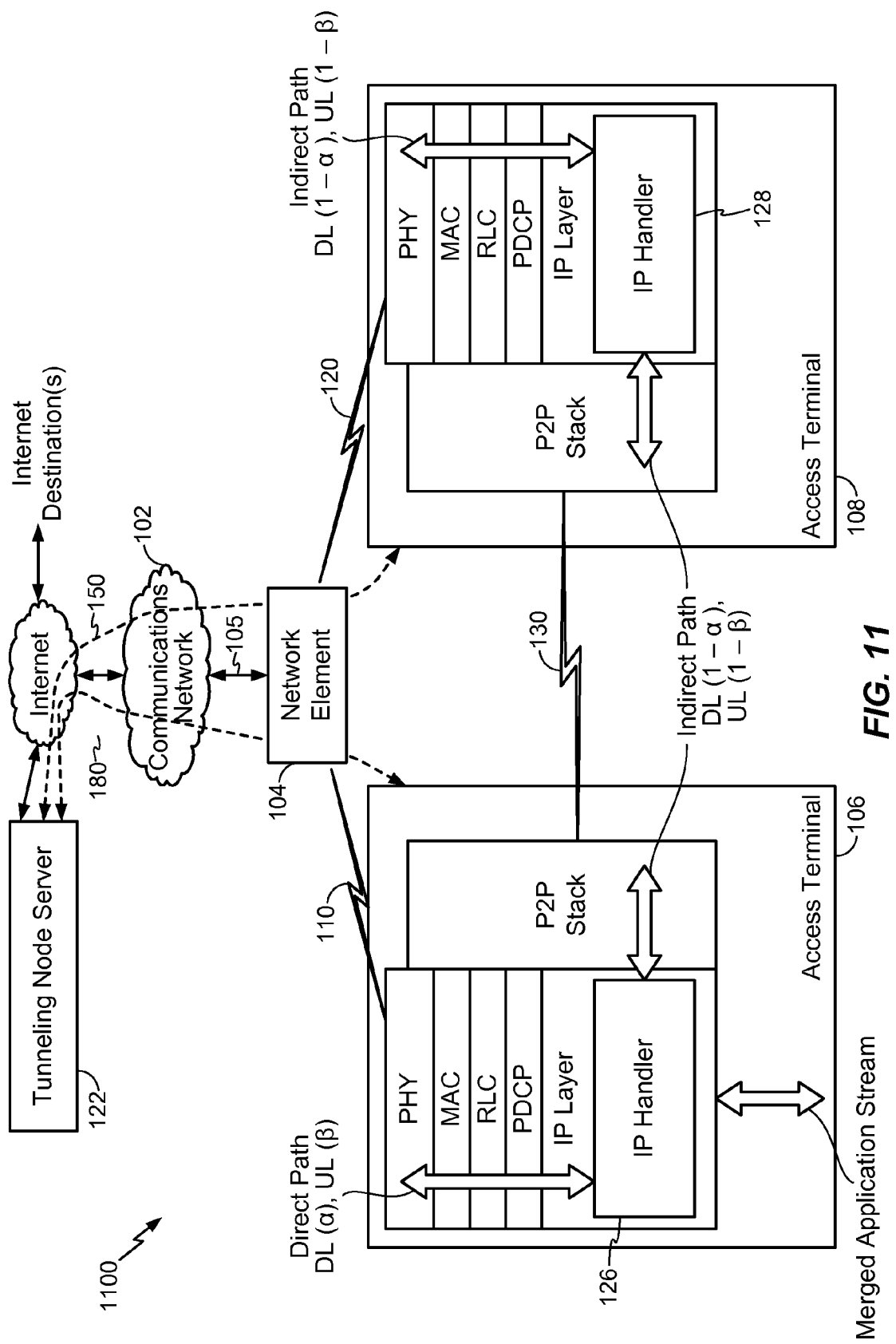
FIG. 11 illustrates an example IP layer link aggregation scheme using a tunneling node server.

FIG. 11 illustrates an example IP layer link aggregation scheme using a tunneling node server. In particular, FIG. 11 illustrates a wireless communication system 1100 including the communications network 102, network element 104, client access terminal 106, and proxy access terminal 108 of FIG. 2, each variously connected by the network link 105, the WWAN links 110 and 120, and the peer-to-peer link 130. The wireless communication system 1100 of FIG. 11 is similar to the wireless communication system 1000 of FIG. 10, except that instead of the tunneling anchor node 112 in the communications network 102 providing IP stream partitioning/merging functions, a tunneling node server 122 outside of the communications network 102 provides these functions. The tunneling node server 122 provides similar functionality as the tunneling anchor node 102 described above in that it splits and merges traffic streams at the IP layer for the client access terminal 106, but it manages the streams differently due to its location outside of the communications network 102. In particular, the tunneling node server 122 in this embodiment is accessed via the Internet, and therefore also uses tunneling procedures to encapsulate IP packets for the client access terminal 106 over a second tunnel path 180. These tunneled IP packets are unwrapped by the client access terminal 106 (e.g., by IP handler 126) and merged with the tunneled IP packets sent to the proxy access terminal 108, forwarded to the client access terminal 106 over the peer-to-peer link 130. Otherwise, IP layer link aggregation using the tunneling node server 122 uses similar processing to that described above with respect to FIG. 10.

Figure 12:
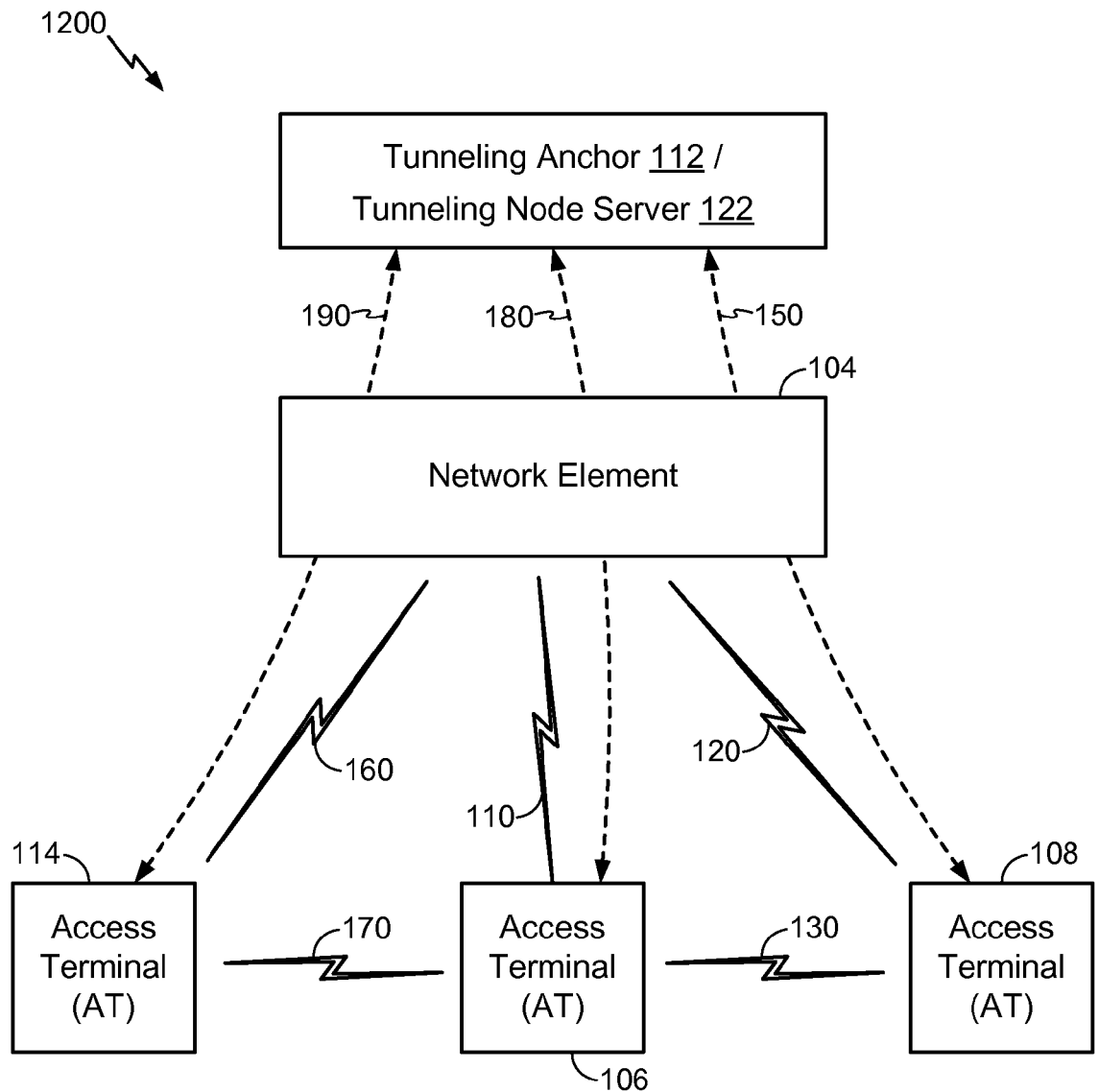
FIG. 12 illustrates IP layer link aggregation in an example network arrangement including multiple proxy access terminals in communication with the client access terminal.

FIG. 12 illustrates IP layer link aggregation in an example network arrangement including multiple proxy access terminals in communication with the client access terminal. In particular, FIG. 12 illustrates a wireless communication system 1200 including the communications network 102, network element 104, client access terminal 106, proxy access terminal 108, and one of the tunneling anchor node 112 of FIG. 10 or tunneling node server 122 of FIG. 11, each variously connected by the WWAN links 110 and 120, the peer-to-peer link 130, and the tunnel paths 150, 180. For simplicity of illustration, the connections between the network element 104 and the tunneling anchor node 112/tunneling node server 122 are omitted from the drawing. The wireless communication system 1200 further includes the second proxy access terminal 114, as in FIG. 7, in communication with the network element 104 via another WWAN link 160 and in communication with the client access terminal 106 via another peer-to-peer link 170. The second proxy access terminal 114 provides an additional indirect path using the communication links 160 and 170 for traffic flow between the network element 104 and client access terminal 106. Here, this indirect path operates as an additional tunnel path 190 for tunneling IP packets for the client access terminal 106 to the proxy access terminal 108 through the network element 104. This additional tunnel path 190 may operate similar to, and in parallel with, the tunnel path 150 for the first proxy access terminal 108 as described above. It will also be appreciated that while one additional proxy access terminal 114 is shown in FIG. 12 for illustration purposes, the techniques provided herein may be generalized to any number of additional proxy access terminals/tunnel paths in other embodiments.

In still other embodiments, link aggregation is implemented by the access terminals 106, 108 themselves without required modification to the WWAN infrastructure. For example, in some traditional WWAN systems (e.g., WWAN systems based on UMTS or HSPA or LTE protocols), transport channel switching may be used in the communication network for dynamic switching between a common transport channel mode (during lower traffic load) and a dedicated transport channel mode (during higher traffic load) depending on packet data traffic load conditions. According to various aspects described below, a transport channel "expansion" mode is provided under the dedicated transport channel mode to utilize radio bearers belonging to the proxy access terminal 108 as an additional indirect path for the client access terminal 106.

Figure 13:
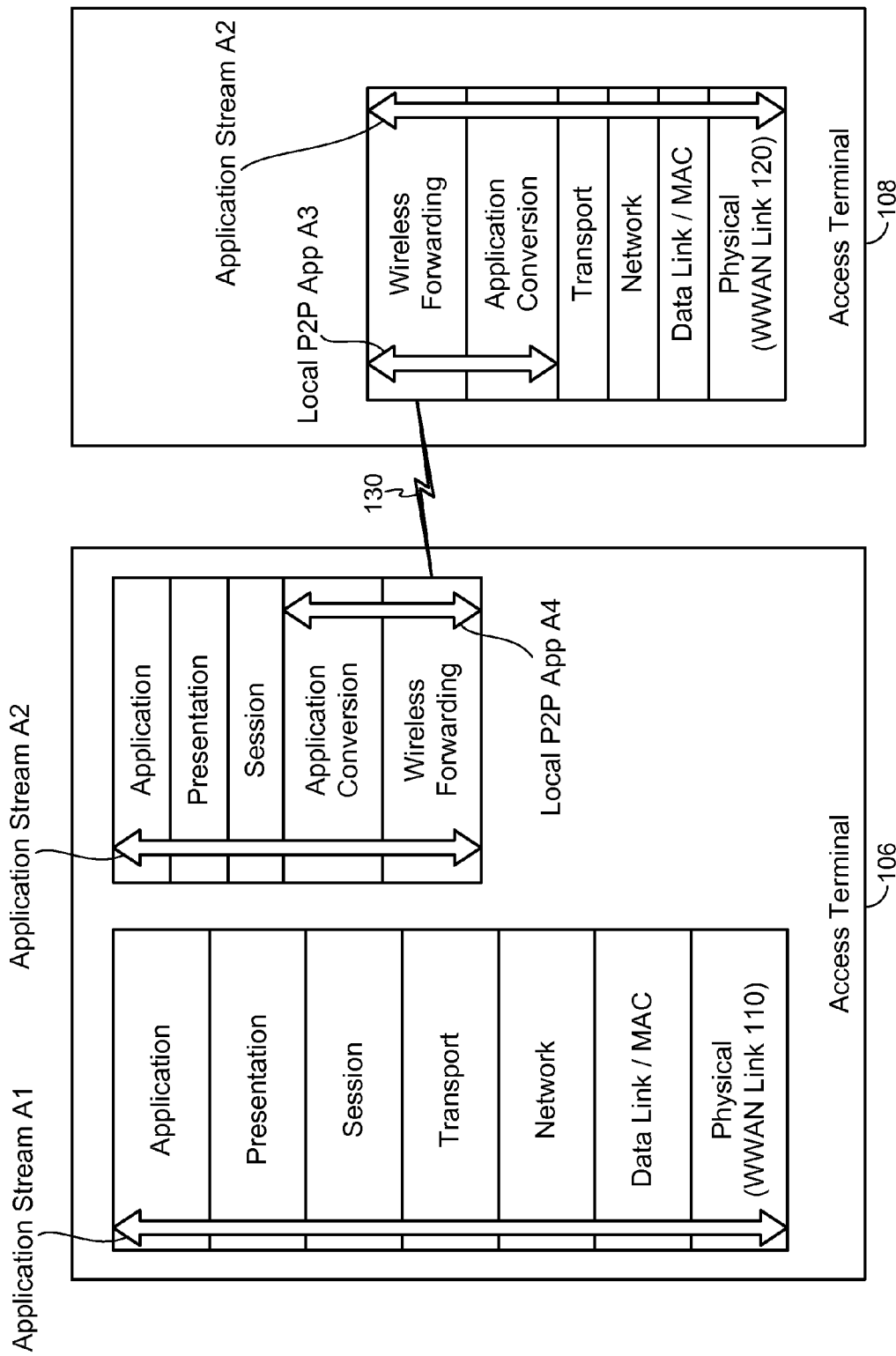
FIG. 13 illustrates an example link aggregation scheme using transport channel expansion.

FIG. 13 illustrates an example link aggregation scheme using transport channel expansion. For simplicity, FIG. 13 shows only the client access terminal 106 and the proxy access terminal 108 in detail. However, it will be appreciated that in certain embodiments the client access terminal 106 and the proxy access terminal 108 may share the same network element (e.g., network element 104 in FIG. 2), whereas in other embodiments the client access terminal 106 and the proxy access terminal 108 may be in communication with different network elements (e.g., network elements 104a, 104b in FIG. 8B). The two access terminals 106, 108 may also be preconfigured to trust each other, as described above with reference to FIGS. 4 and 5.

Returning to FIG. 13, the client access terminal 106 starts a first application stream A1 over its own WWAN link 110. In this example, the available remaining bandwidth on the WWAN link 110 is not sufficient for the client access terminal 106 to run a second application stream A2. Instead, the client access terminal 106 and proxy access terminal 108 partition the WWAN protocol stack for the second application stream A2 at the transport layer such that all processing at or below the transport layer is performed at the proxy access terminal 108, and all processing above the transport layer is performed at the client access terminal 106. To do so, two additional layers below the session layer are provided, as shown. These two layers are (1) an application conversion layer, and (2) a wireless forwarding layer.

The application conversion layer performs the intermediary processing to convert the second application stream A2 for transmission between the client access terminal 106 and the proxy access terminal 108, and the wireless forwarding layer enables forwarding of the bits for the second application stream A2 over the peer-to-peer link 130. In the example of FIG. 13, the proxy access terminal 108 runs a local peer application A3 at these two layers and the client access terminal 106 runs an equivalent local peer application A4 at these two layers. The peer application A4 on the client access terminal 106 has the additional task of communicating with the session layer for the partitioned second application stream A2. Likewise, the peer application A3 on the proxy access terminal 108 has the additional task of communicating with the transport layer at the client access terminal 106 for the partitioned second application stream A2.

In this embodiment, the peer application A3 at the proxy access terminal 108 creates a transport layer endpoint (such as a Transmission Control Protocol (TCP) endpoint) with a port number assigned by the operating system running on the proxy access terminal 108. This endpoint is mapped to the peer application A3 to facilitate communication over the peer-to-peer link 130 to the peer application A4 at the client access terminal 106. Any bits received at the client access terminal 106 over the peer-to-peer link 130 for the second application stream A2 are sent to the session layer for continued processing. Likewise, any bits received from the session layer for the second application stream A2 are forwarded by the peer application A4 at the client access terminal 106 to the peer application A3 at the proxy access terminal 108 over the peer-to-peer link 130. These bits are sent by the peer application A3 to the transport layer at the proxy access terminal 108 for continued processing and subsequent transmission over the WWAN link 120.

In general, the combination of the application conversion layer and the wireless forwarding layer may be implemented as an OSI stack using TCP or UDP or another transport protocol over IP. For example, an embedded TCP/IP or UDP/IP stack may be used for transmission of the bit streams flowing between the client access terminal 106 and the proxy access terminal 108. Usage of TCP may facilitate reliable bit transfers over the peer-to-peer link 130.

According to this application partitioning scheme, the first application stream A1 uses the WWAN IP address of the client access terminal 106, whereas the second application stream A2 uses the WWAN IP address of the proxy access terminal 108. Thus, the second application stream A2 appears to originate from the proxy access terminal 108, even though it actually originated from the client access terminal 106. Therefore, no modifications to the WWAN infrastructure are required. Although only one proxy access terminal 108 is shown in FIG. 13 for illustration purposes, the transport channel expansion techniques provided herein may be generalized to any number of additional proxy access terminals in other embodiments.

The use of the expanded transport channels may be optional depending on increased packet data traffic load for the client access terminal 106. For example, when the traffic loading requirements for the client access terminal 106 are higher than the available dynamic capacity of the direct path, the expanded transport channels may be used dynamically. Also, if a reduced packet data traffic load is observed consistently for the access terminal 106 over a certain duration of time, the expanded transport channels associated with the access terminal 108 may be released. Subsequently, if the traffic load increases, these released expanded transport channels may be re-acquired dynamically if necessary to deliver aggregated traffic to the client access terminal 106.

Figure 14:
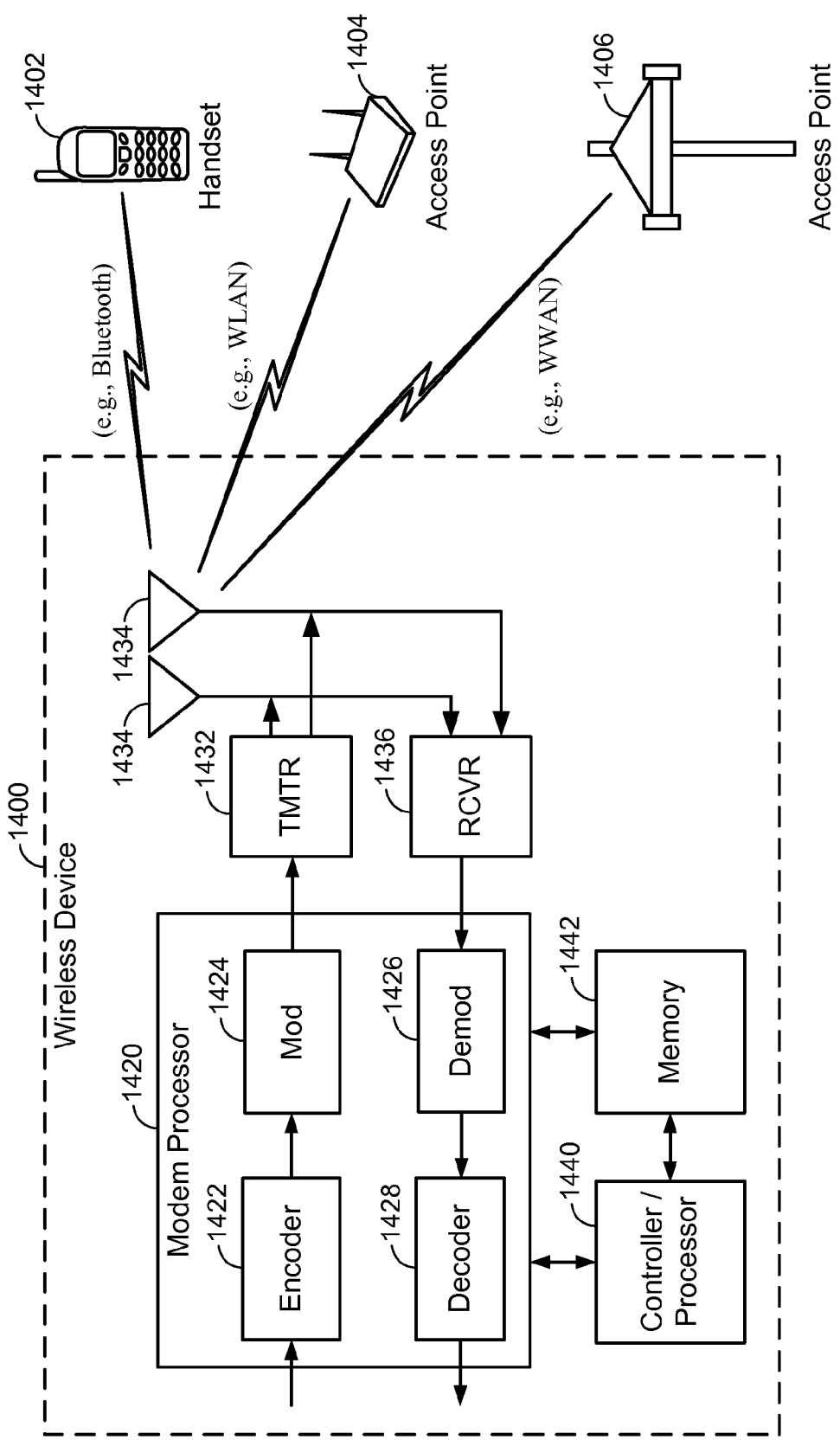
FIG. 14 illustrates an example wireless device for operation in a heterogeneous wireless network, such as those described herein.

FIG. 14 illustrates an example wireless device for operation in a heterogeneous wireless network, such as those described above. As shown, the wireless device 1400 is capable of communicating peer-to-peer with other wireless devices such as a handset 1402, and also capable of communicating with outside networks via one or more access points 1404, 1406 (forming at least part of a network element, such as the network element 104). On the transmit path, traffic data to be sent by wireless device 1400 is processed (e.g., formatted, encoded, and interleaved) by an encoder 1422 and further processed (e.g., modulated, channelized, and scrambled) by a modulator (Mod) 1424 in accordance with an applicable radio technology (e.g., for Wi-Fi or WWAN) to generate output chips. A transmitter (TMTR) 1432 then conditions (e.g., converts to analog, filters, amplifies, and upconverts) the output chips and generates a modulated signal, which is transmitted via one or more antennas 1434.

On the receive path, antennas 1434 receive signals transmitted by other wireless devices 1402 (e.g., Bluetooth), and access points 1404 (e.g., WLAN) and/or 1406 (e.g., WWAN). A receiver (RCVR) 1436 conditions (e.g., filters, amplifies, downconverts, and digitizes) a received signal from the one or more antennas 1434 and provides samples. A demodulator (Demod) 1426 processes (e.g., descrambles, channelizes, and demodulates) the samples and provides symbol estimates. A decoder 1428 further processes (e.g., deinterleaves and decodes) the symbol estimates and provides decoded data. Encoder 1422, modulator 1424, demodulator 1426, and decoder 1428 may be implemented by a modem processor 1420. These units perform processing in accordance with the radio technology or technologies used for communication.

A controller/processor 1440 controls the operation of wireless device 1400. A memory 1442 stores data and program codes for wireless device 1400. Controller/processor 1440 may control one or more of the link aggregation processes/techniques described herein. Memory 1442 may store various types of information such as the data and/or program codes for the link aggregation processes/techniques described herein.

Another embodiment for communicating via link aggregation in a heterogeneous wireless communication system, is a method, comprising: establishing a first communication path between a wireless communication device and a network element. And discovering a peer-to-peer communication link between the wireless communication device and a proxy access terminal, the wireless communication device and proxy access terminal being separate individual devices. Then, establishing a second communication path between the wireless communication device and the network element using the discovered peer-to-peer communication link with the proxy access terminal. Splitting data at the network element between the first and second communication paths. And transmitting the data from the network element via both the first and second communication paths.

Another embodiment for communicating via link aggregation in a heterogeneous wireless communication system, is an apparatus, comprising: means for establishing a first communication path between a wireless communication device and a network element. And means for discovering a peer-to-peer communication link between the wireless communication device and a proxy access terminal, the wireless communication device and proxy access terminal being separate individual devices. Means for establishing a second communication path between the wireless communication device and the network element using the discovered peer-to-peer communication link with the proxy access terminal. And means for splitting data at the network element between the first and second communication paths. And means for transmitting the data from the network element via both the first and second communication paths.

And yet another embodiment for communicating via link aggregation in a heterogeneous wireless communication system is a method, comprising: establishing a first communication path between a wireless communication device and an evolved NodeB (EnodeB). Then, establishing a peer-to-peer communication link between the wireless communication device and a proxy access terminal via a Mobile Management Entity (MME), the wireless communication device and proxy access terminal being separate individual devices. And establishing a second communication path between the wireless communication device and the EnodeB using the peer-to-peer communication link with the proxy access terminal Receiving data from the EnodeB via both the first and second communication paths. And aggregating the received data.

In another embodiment for communicating via link aggregation in a heterogeneous wireless communication system is an apparatus, comprising: means for establishing a first communication path between a wireless communication device and an evolved NodeB (EnodeB). And means for establishing a peer-to-peer communication link between the wireless communication device and a proxy access terminal via a Mobile Management Entity (MME), the wireless communication device and proxy access terminal being separate individual devices. And means for establishing a second communication path between the wireless communication device and the EnodeB using the peer-to-peer communication link with the proxy access terminal. Means for receiving data from the EnodeB via both the first and second communication paths. And means for aggregating the received data.

And yet in another embodiment for communicating via link aggregation in a heterogeneous wireless communication system is a method, comprising: establishing a first communication path between a wireless communication device and an evolved NodeB (EnodeB). Then, establishing a peer-to-peer communication link between the wireless communication device and a proxy access terminal via a Mobile Management Entity (MME), the wireless communication device and proxy access terminal being separate individual devices. And establishing a second communication path between the wireless communication device and the EnodeB using the peer-to-peer communication link with the proxy access terminal. Splitting data at the EnodeB between the first and second communication paths. And transmitting the data from the EnodeB via both the first and second communication paths.

In another embodiment for communicating via link aggregation in a heterogeneous wireless communication system is an apparatus, comprising: means for establishing a first communication path between a wireless communication device and an evolved NodeB (EnodeB). Means for establishing a peer-to-peer communication link between the wireless communication device and a proxy access terminal via a Mobile Management Entity (MME), the wireless communication device and proxy access terminal being separate individual devices. And means for establishing a second communication path between the wireless communication device and the EnodeB using the peer-to-peer communication link with the proxy access terminal. Means for splitting data at the EnodeB between the first and second communication paths. And means for transmitting the data from the EnodeB via both the first and second communication paths.

Those skilled in the art will further appreciate that the various illustrative logical blocks, modules, and steps described in connection with the aspects disclosed herein may be implemented as hardware, software, firmware, or any combination thereof and hardware implementation may be digital, analog or both. To clearly illustrate this interchangeability of hardware and software, various illustrative components, blocks, modules, and steps have been described above generally in terms of their functionality. In addition, for each of the embodiments described herein, the corresponding form of any such embodiments may be described herein as, for example, "logic configured to" perform the described action.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The various illustrative logical blocks and modules described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an integrated circuit, one or more microprocessors in conjunction with a DSP core, or any other such configuration.

The steps or functions of a method or algorithm described in connection with the aspects disclosed herein may be embodied directly in hardware, in software executed by a processor, or in a combination of the two. The steps or functions could be interchanged without departing from the scope of the aspects.

If the steps or functions are implemented in software, the steps or functions may be stored on or transmitted over as one or more instructions of code on a computer-readable medium. Computer-readable media includes both computer storage media and communication media including any media that facilitates transfer of a computer program from one place to another. A storage media may be any available media that could be assessed by a general purpose or special purpose computer. By way of example, and not limitation, such computer-readable media could comprise RAM, flash memory, ROM, EPROM, EEPROM, registers, hard disk, a removable disk, a CD-ROM, optical disk storage, magnetic disk storage, magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source, using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically. A computer program product would also indicate materials to package the CD or software medium therein. Combinations of the above should also be included within the scope of computer-readable media. An exemplary storage medium is coupled to the processor such that the processor could read information from, and write information to, the storage medium. In the alternative, the storage medium may be integral to the processor. The storage medium may be a memory unit. The processor and the storage medium may reside in an ASIC. The ASIC may reside in a user terminal. In the alternative, the processor and the storage medium may reside as discrete components in a user terminal.

The previous description of the certain aspects is provided to enable any person skilled in the art to make or use the invention. Various modifications to these aspects will be readily apparent to those skilled in the art, and the generic principles defined herein may be applied to other aspects without departing from the scope of this disclosure. Thus, this disclosure is not intended to be limited to the aspects shown herein but is to be accorded the widest scope consistent with the principles and novel features disclosed herein.

What is claimed is:

1. A wireless communication device for communicating via link aggregation in a heterogeneous wireless communication system, comprising:
    logic configured to establish a first communication path between the wireless communication device and a network element comprising (i) a Radio Network Controller and a NodeB, or (ii) an Evolved NodeB;
    logic configured to discover a peer-to-peer communication link between the wireless communication device and a proxy access terminal, the wireless device and proxy access terminal being separate individual devices;
    logic configured to establish a second communication path between the wireless communication device and the network element using the discovered peer-to-peer communication link with the proxy access terminal;
    receiver circuitry logic configured to receive data from the network element via both the first and second communication paths; and
    logic configured to aggregate the received data.

2. The wireless communication device of claim 1, wherein discovering the peer-to-peer link comprises establishing mutual trust between the wireless communication device and the proxy access terminal.

3. The wireless communication device of claim 2, wherein the mutual trust is established by the wireless communication device and the proxy access terminal (i) being affiliated with each other, (ii) being controlled by a common entity, or (iii) having trusted each other previously.

4. The wireless communication device of claim 1, wherein discovering the peer-to-peer link comprises exchanging capability information regarding the availability of proxy access terminal resources.

5. The wireless communication device of claim 1, wherein the received data includes Radio Link Control (RLC) layer Protocol Data Units (PDUs) partitioned between the first and second paths by the network element, and aggregating the data comprises merging the RLC-PDUs at the RLC layer on the wireless communication device to form a merged application data stream.

6. The wireless communication device of claim 1, wherein the received data includes Internet Protocol (IP) packets tunneled to at least one of the wireless communication device or the proxy access terminal via the network element, and aggregating the data comprises merging the IP packets at the IP layer on the wireless communication device to form a merged application data stream.

7. The wireless communication device of claim 1, wherein the data received via the first communication path corresponds to a first application stream using a first Internet Protocol (IP) address associated with the wireless communication device, and the data received via the second communication path corresponds to a second application stream using a second IP address associated with the proxy access terminal.

8. The wireless communication device of claim 1, further comprising logic configured to send feedback information for data received on the second communication path via the first communication path.

9. The wireless communication device of claim 1, further comprising:
logic configured to discover a peer-to-peer communication link between the wireless communication device and a second proxy access terminal;
logic configured to establish a third communication path between the wireless communication device and the network element using the discovered peer-to-peer communication link with the second proxy access terminal; and
logic configured to receive data from the network element via the first, second, and third communication paths.

10. The wireless communication device of claim 1, wherein the second communication path is formed using at least one additional network element not part of the first communication path.

11. The wireless communication device of claim 1, wherein the data of the second communication path is transmitted early or delayed as compared to the data of the first communication path based on an inter-carrier skew between the two communication paths such that the data received via the two communication paths arrives closer together in time than if transmitted simultaneously.

12. The wireless communication device of claim 1, further comprising logic configured to transmit data to the network element via both the first and second communication paths.

13. The wireless communication device of claim 1, wherein the peer-to-peer link uses a protocol selected from the group consisting of Bluetooth, Ultra-Wide Band, and Wireless Local Area Network protocols.

14. The wireless communication device of claim 1, further comprising logic configured to form a single logical device with a common identity from the wireless communication device and the proxy access terminal, the first and second communication paths being established between the wireless communication device and the network element according to the common identity.

15. The wireless communication device of claim 1, further comprising logic configured to manage the peer-to-peer communication link using a peer-to-peer application for coordinating between the wireless communication device and the proxy access terminal.

16. A method for communicating using a wireless communication device via link aggregation in a heterogeneous wireless communication system, comprising:
establishing a first communication path between the wireless communication device and a network element comprising (i) a Radio Network Controller and a NodeB, or (ii) an Evolved NodeB;
discovering a peer-to-peer communication link between the wireless communication device and a proxy access terminal, the wireless device and proxy access terminal being separate individual devices;
establishing a second communication path between the wireless communication device and the network element using the discovered peer-to-peer communication link with the proxy access terminal;
receiving data from the network element via both the first and second communication paths; and
aggregating the received data.

17. The method of claim 16, wherein discovering the peer-to-peer link comprises establishing mutual trust between the wireless communication device and the proxy access terminal.

18. The method of claim 16, wherein the received data includes Radio Link Control (RLC) layer Protocol Data Units (PDUs) partitioned between the first and second paths by the network element or Internet Protocol (IP) packets tunneled to at least one of the wireless communication device or the proxy access terminal via the network element, and aggregating the data comprises merging the RLC-PDUs at the RLC layer or merging the IP packets at the IP layer, respectively, on the wireless communication device to form a merged application data stream.

19. The method of claim 16, wherein the data received via the first communication path corresponds to a first application stream using a first Internet Protocol (IP) address associated with the wireless communication device, and the data received via the second communication path corresponds to a second application stream using a second IP address associated with the proxy access terminal.

20. The method of claim 16, further comprising:
discovering a peer-to-peer communication link between the wireless communication device and a second proxy access terminal;
establishing a third communication path between the wireless communication device and the network element using the discovered peer-to-peer communication link with the second proxy access terminal; and
receiving data from the network element via the first, second, and third communication paths.

21. The method of claim 16, further comprising transmitting data to the network element via both the first and second communication paths.

22. The method of claim 16, further comprising forming a single logical device with a common identity from the wireless communication device and the proxy access terminal, the first and second communication paths being established between the wireless communication device and the network element according to the common identity.

23. A wireless communication device for communicating via link aggregation in a heterogeneous wireless communication system, comprising:
means for establishing a first communication path between the wireless communication device and a network element comprising (i) a Radio Network Controller and a NodeB, or (ii) an Evolved NodeB;
means for discovering a peer-to-peer communication link between the wireless communication device and a proxy access terminal, the wireless device and proxy access terminal being separate individual devices;
means for establishing a second communication path between the wireless communication device and the network element using the discovered peer-to-peer communication link with the proxy access terminal;
means for receiving data from the network element via both the first and second communication paths; and
means for aggregating the received data, wherein the means for establishing, discovering, establishing, receiving, or aggregating include hardware circuitry.

24. The wireless communication device of claim 23, wherein the means for discovering the peer-to-peer link comprises means for establishing mutual trust between the wireless communication device and the proxy access terminal.

25. The wireless communication device of claim 23, wherein the received data includes Radio Link Control (RLC) layer Protocol Data Units (PDUs) partitioned between the first and second paths by the network element or Internet Protocol (IP) packets tunneled to at least one of the wireless communication device or the proxy access terminal via the network element, and the means for aggregating the data comprises means for merging the RLC-PDUs at the RLC layer or merging the IP packets at the IP layer, respectively, on the wireless communication device to form a merged application data stream.

26. The wireless communication device of claim 23, wherein the data received via the first communication path corresponds to a first application stream using a first Internet Protocol (IP) address associated with the wireless communication device, and the data received via the second communication path corresponds to a second application stream using a second IP address associated with the proxy access terminal.

27. The wireless communication device of claim 23, further comprising:
   means for discovering a peer-to-peer communication link between the wireless communication device and a second proxy access terminal;
   means for establishing a third communication path between the wireless communication device and the network element using the discovered peer-to-peer communication link with the second proxy access terminal; and
   means for receiving data from the network element via the first, second, and third communication paths.

28. The wireless communication device of claim 23, further comprising means for transmitting data to the network element via both the first and second communication paths.

29. The wireless communication device of claim 23, further comprising means for forming a single logical device with a common identity from the wireless communication device and the proxy access terminal, the first and second communication paths being established between the wireless communication device and the network element according to the common identity.

30. A non-transitory computer-readable storage medium comprising code, which, when executed by a processor, causes the processor to perform operations for communicating using a wireless communication device via link aggregation in a heterogeneous wireless communication system, the non-transitory computer-readable storage medium comprising:
   code for establishing a first communication path between the wireless communication device and a network element comprising (i) a Radio Network Controller and a NodeB, or (ii) an Evolved NodeB;
   code for discovering a peer-to-peer communication link between the wireless communication device and a proxy access terminal, the wireless device and proxy access terminal being separate individual devices;
   code for establishing a second communication path between the wireless communication device and the network element using the discovered peer-to-peer communication link with the proxy access terminal;
   code for receiving data from the network element via both the first and second communication paths; and
   code for aggregating the received data.

31. The non-transitory computer-readable storage medium of claim 30, wherein the code for discovering the peer-to-peer link comprises code for establishing mutual trust between the wireless communication device and the proxy access terminal.

32. The non-transitory computer-readable storage medium of claim 30, wherein the received data includes Radio Link Control (RLC) layer Protocol Data Units (PDUs) partitioned between the first and second paths by the network element or Internet Protocol (IP) packets tunneled to at least one of the wireless communication device or the proxy access terminal via the network element, and the code for aggregating the data comprises code for merging the RLC-PDUs at the RLC layer or merging the IP packets at the IP layer, respectively, on the wireless communication device to form a merged application data stream.

33. The non-transitory computer-readable storage medium of claim 30, wherein the data received via the first communication path corresponds to a first application stream using a first Internet Protocol (IP) address associated with the wireless communication device, and the data received via the second communication path corresponds to a second application stream using a second IP address associated with the proxy access terminal.

34. The non-transitory computer-readable storage medium of claim 30, further comprising:
   code for discovering a peer-to-peer communication link between the wireless communication device and a second proxy access terminal;
   code for establishing a third communication path between the wireless communication device and the network element using the discovered peer-to-peer communication link with the second proxy access terminal; and
   code for receiving data from the network element via the first, second, and third communication paths.

35. The non-transitory computer-readable storage medium of claim 30, further comprising code for transmitting data to the network element via both the first and second communication paths.

36. The non-transitory computer-readable storage medium of claim 30, further comprising code for forming a single logical device with a common identity from the wireless communication device and the proxy access terminal, the first and second communication paths being established between the wireless communication device and the network element according to the common identity.

37. An apparatus for communicating using a wireless communication device via link aggregation in a heterogeneous wireless communication system, comprising:
   a processor configured to establish a first communication path between the wireless communication device and a network element comprising (i) a Radio Network Controller and a NodeB, or (ii) an Evolved NodeB, configured to discover a peer-to-peer communication link between the wireless communication device and a proxy access terminal, the wireless device and proxy access terminal being separate individual devices, configured to establish a second communication path between the wireless communication device and the network element using the discovered peer-to-peer communication link with the proxy access terminal, configured to receive data from the network element via both the first and second communication paths, and configured to aggregating the received data;
   and a memory unit coupled to the processor.

38. A method for communicating using a wireless communication device via link aggregation in a heterogeneous wireless communication system, comprising:
   establishing a first communication path between the wireless communication device and a network element;
   discovering a peer-to-peer communication link between the wireless communication device and a proxy access terminal, the wireless device and proxy access terminal being separate individual devices;
   establishing a second communication path between the wireless communication device and the network element using the discovered peer-to-peer communication link with the proxy access terminal;

receiving data from the network element via both the first and second communication paths, the received data including Radio Link Control (RLC) layer Protocol Data Units (PDUs) partitioned between the first and second paths by the network element; and aggregating the received data by merging the RLC-PDUs at the RLC layer on the wireless communication device to form a merged application data stream.

* * * * *